US009432430B1

(12) United States Patent
Klenz

(10) Patent No.: US 9,432,430 B1
(45) Date of Patent: Aug. 30, 2016

(54) EVENT STREAM PROCESSING DEVICE PROVIDING REAL-TIME INCIDENT IDENTIFICATION

(71) Applicant: SAS Institute Inc., Cary, NC (US)

(72) Inventor: Bradley Klenz, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/966,228

(22) Filed: Dec. 11, 2015

Related U.S. Application Data

(60) Provisional application No. 62/142,277, filed on Apr. 2, 2015, provisional application No. 62/200,394, filed on Aug. 3, 2015.

(51) Int. Cl.
*G06F 15/173* (2006.01)
*H04L 29/06* (2006.01)
*H04L 12/26* (2006.01)

(52) U.S. Cl.
CPC ............ *H04L 65/601* (2013.01); *H04L 43/10* (2013.01)

(58) Field of Classification Search
CPC .......................... H04L 65/601; H04L 43/10
USPC ................................................ 709/223, 224
See application file for complete search history.

(56) References Cited

U.S. PATENT DOCUMENTS

| | | | | |
|---|---|---|---|---|
| 8,390,445 B2* | 3/2013 | Betts | ................. | G08B 13/1427 340/539.11 |
| 8,631,031 B1* | 1/2014 | Kepner | ............. | G06F 17/30587 707/769 |
| 2011/0167391 A1* | 7/2011 | Momeyer | ............. | G06F 1/1684 715/863 |
| 2015/0120706 A1* | 4/2015 | Hoffman | ........... | G06F 17/30864 707/722 |

OTHER PUBLICATIONS

SAS Institute Inc. 2014. SAS/ETS® 13.2 User's Guide. Cary, NC: SAS Institute Inc.
B. Klenz, Event Stream Processing for Power Grid Analysis, 2015 Informs Conference on Business Analytics and Operations Research, Apr. 12-14, 2015, Huntington Beach, CA.
Leonard et al., An Introduction to Similarity Analysis Using SAS®, Apr. 1, 2014.
SAS Institute Inc. 2011. SAS/STAT® 9.3 User's Guide. Cary, NC: SAS Institute Inc.

* cited by examiner

Primary Examiner — Viet Vu
(74) Attorney, Agent, or Firm — Bell & Manning, LLC

(57) ABSTRACT

A computing device to perform incident identification on streamed event data is provided. An event block object is received. The event block object includes a measurement data value generated by a sensor. A plurality of measurement data values and associated time values are extracted for the plurality of event block objects that occur during a time window. A similarity measure is computed between the measurement data values and each of a plurality of reference incident signatures. A best matching reference incident signature is selected from the similarity measures. The similarity measure for the selected best matching reference incident signature is compared to a threshold value. When the selected similarity measure satisfies the threshold value, a type of incident for the extracted measurement data values is identified as a type of incident defined for the selected best matching reference incident signature and is output to an incident information subscribing device.

29 Claims, 28 Drawing Sheets

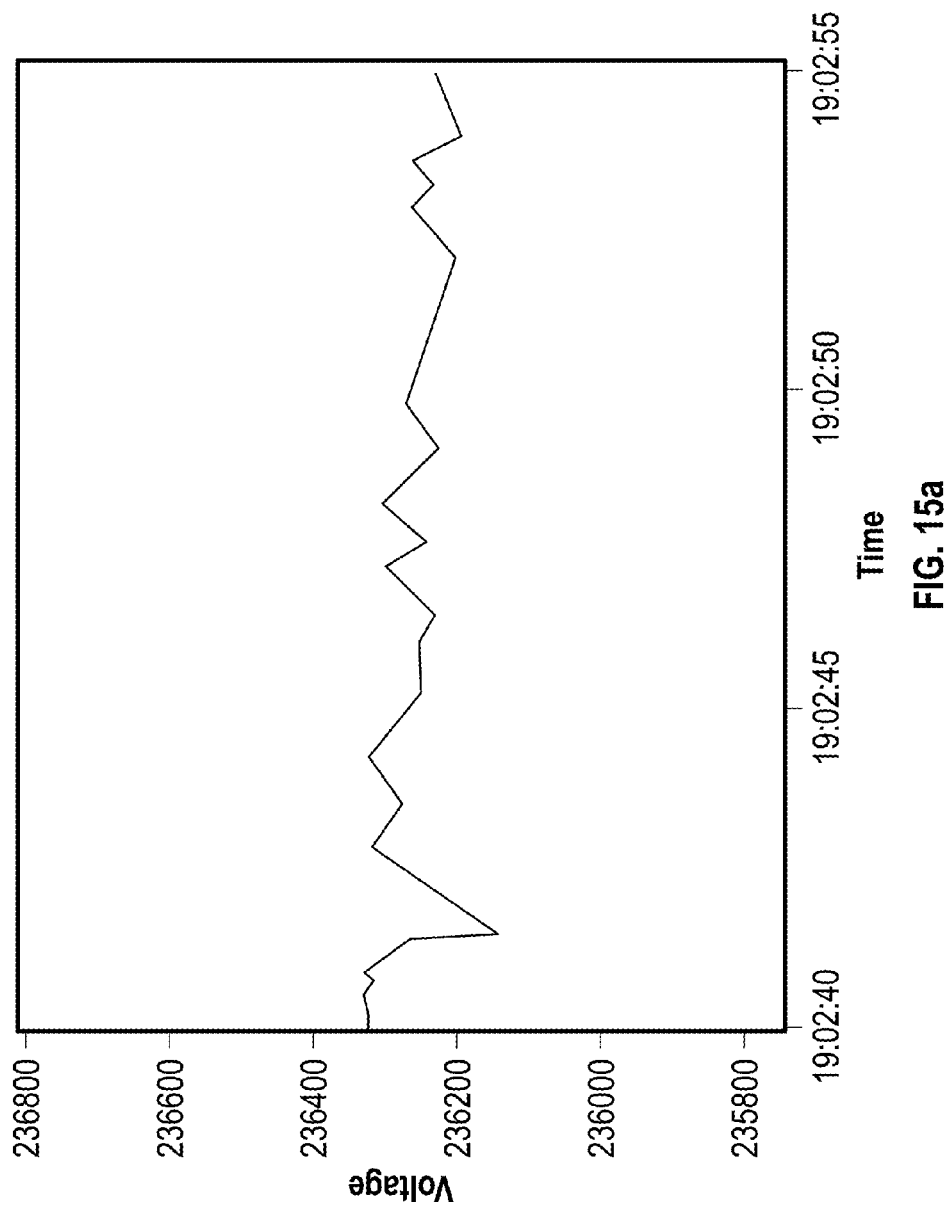

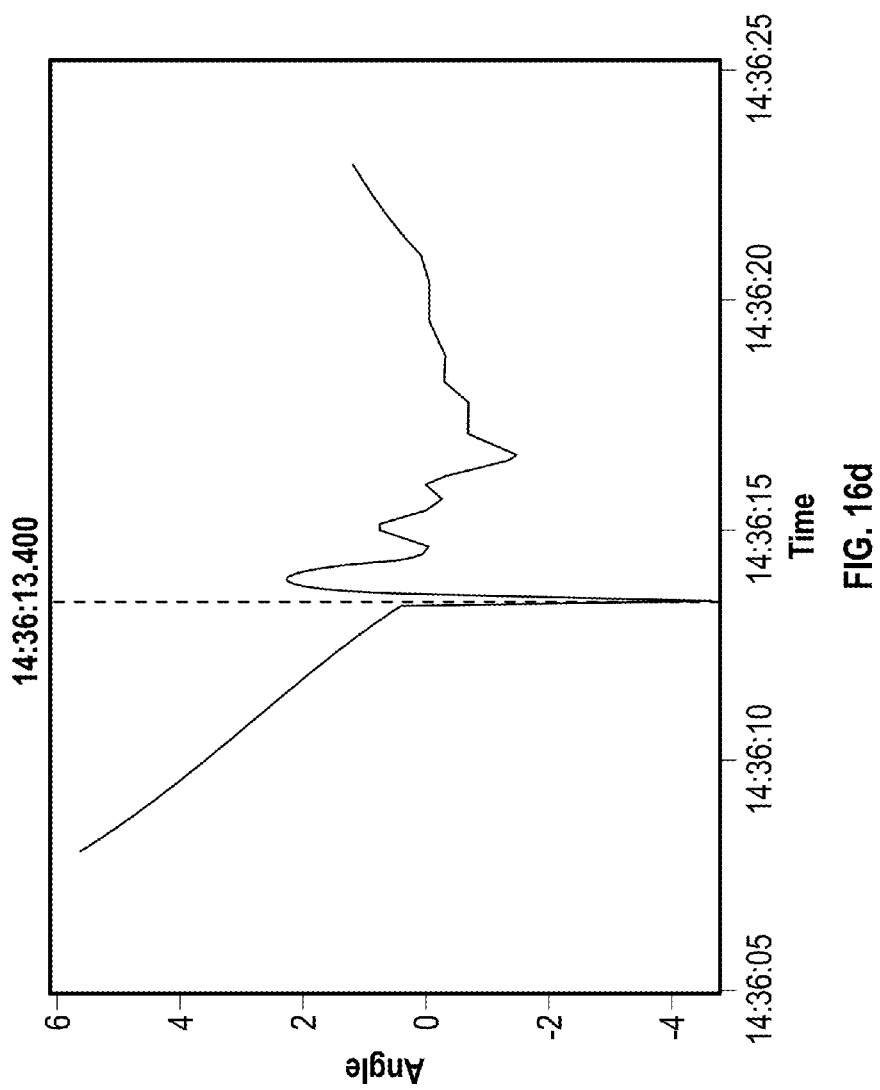

EVENT STREAM PROCESSING DEVICE PROVIDING REAL-TIME INCIDENT IDENTIFICATION

CROSS-REFERENCE TO RELATED APPLICATIONS

The present application claims the benefit of 35 U.S.C. §119(e) to U.S. Provisional Patent Application No. 62/142,277 filed Apr. 2, 2015 and to U.S. Provisional Patent Application No. 62/200,394 filed Aug. 3, 2015, the entire contents of which are hereby incorporated by reference.

BACKGROUND

An increasing number of distributed applications process continuously flowing data from geographically distributed sources, perform analytics on the streamed data, and provide analysis results to entities that may also be geographically distributed. The continuously flowing data may be generated from sensor measurements that capture real-time data describing current operating characteristics of a remotely distributed device.

SUMMARY

In an example embodiment, a computer-readable medium is provided having stored thereon computer-readable instructions that when executed by a computing device, cause the computing device to perform incident identification on streamed event data. An event block object is received from an event publishing device. The event block object is received as part of an event stream of a plurality of event block objects received from the event publishing device. The event block object includes a measurement data value and a time value. The measurement data value is generated by a sensor at a time indicated by the time value. A plurality of measurement data values and associated time values for the plurality of event block objects that occur during a time window are extracted. A similarity measure is computed between the extracted measurement data values and each of a plurality of reference incident signatures defined for incidents that occurred previously in time. A best matching reference incident signature is selected from the computed similarity measures. The computed similarity measure for the selected best matching reference incident signature is compared to a threshold value. When the computed similarity measure for the selected best matching reference incident signature satisfies the threshold value based on the comparison, a type of incident for the extracted measurement data values is identified as a type of incident defined for the selected best matching reference incident signature, and the identified type of incident and the extracted measurement data values are output to an incident information subscribing device.

In another example embodiment, a system is provided. The system includes, but is not limited to, a processor and a computer-readable medium operably coupled to the processor. The computer-readable medium has instructions stored thereon that, when executed by the processor, cause the system to perform incident identification on streamed event data.

In yet another example embodiment, a method of performing incident identification on streamed event data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 15a-15d show normal operating measurements for a voltage, current, frequency, and phase angle, respectively, of the instance of FIG. 14 in accordance with an illustrative embodiment.

FIGS. 16a-16d show measurements for the voltage, current, frequency, and phase angle, respectively, of the instance of FIG. 14 in accordance with an illustrative embodiment for a time window within which a lightning strike incident occurred.

Referring to FIG. 20, a comparison between the incoming incident voltage measurement curve of FIG. 19 and a line trip voltage measurement curve of FIG. 17a.

DETAILED DESCRIPTION

Figure 1:
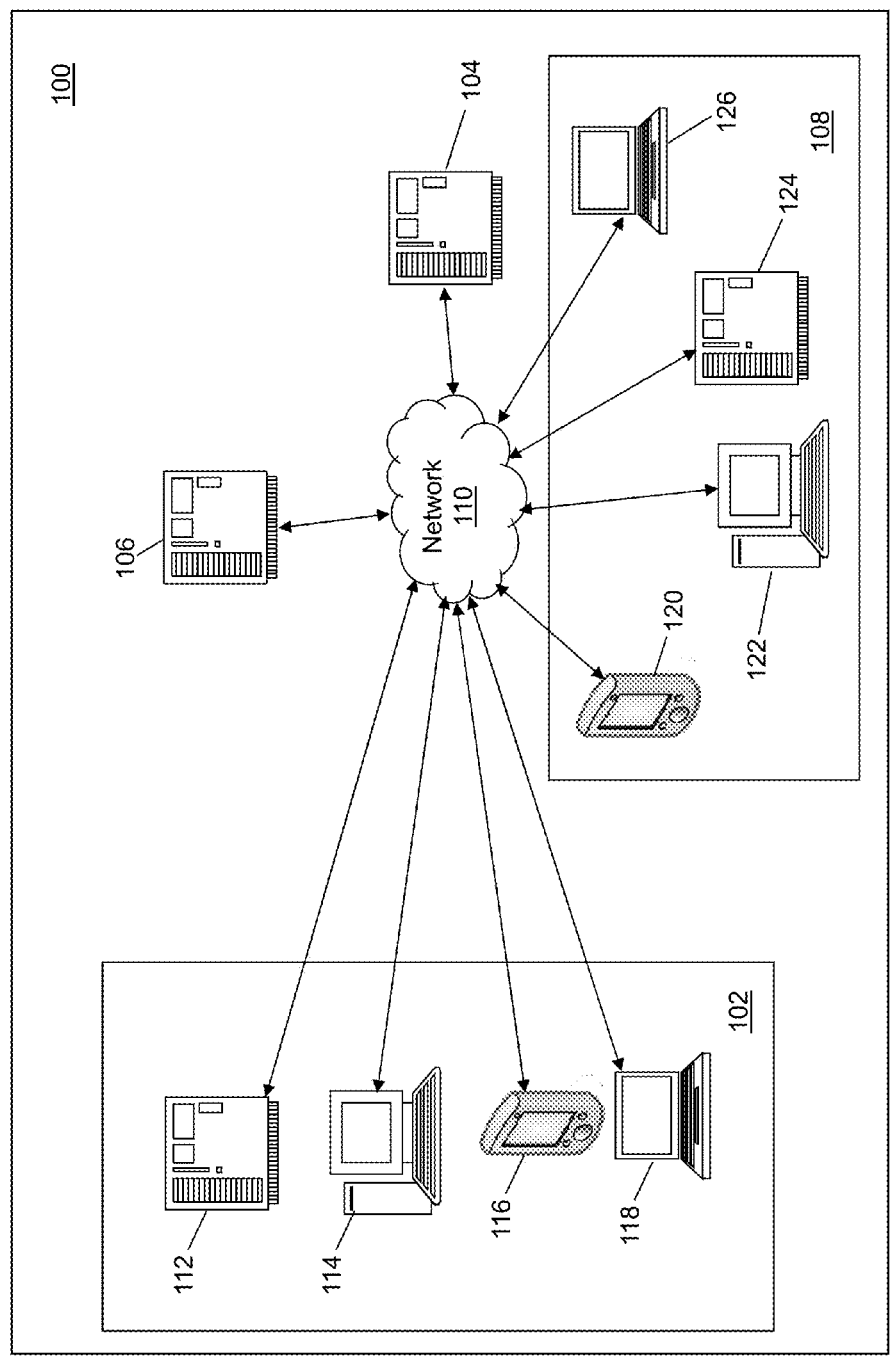
FIG. 1 depicts a block diagram of a stream processing system in accordance with an illustrative embodiment.

Referring to FIG. 1, a block diagram of a stream processing system 100 is shown in accordance with an illustrative embodiment. In an illustrative embodiment, stream processing system 100 may include a plurality of event publishing systems 102, an event stream processing (ESP) device 104, a reference incidents determination device 106, a plurality of incident information subscribing systems 108, and a network 110. Each of the plurality of event publishing systems 102, ESP device 104, reference incidents determination device 106, and the plurality of incident information subscribing systems 108 may be composed of one or more discrete devices in communication through network 110. ESP device 104 and reference incidents determination device 106 may be integrated into a single computing device.

The plurality of event publishing systems 102 includes, is integrated with, and/or communicates with one or more sensors that produce sensor signal values referred to as measurement data values. A sensor may measure a physical quantity in an environment to which the sensor is associated and generate a corresponding measurement datum that typically is associated with a time that the measurement datum is generated. The environment to which the sensor is associated for monitoring may include a power grid system, a telecommunications system, a fluid (oil, gas, water, etc.) pipeline, a transportation system, an industrial device, a medical device, an appliance, a vehicle, a computing device, etc. Example sensors include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a sensor may be a computing device that receives a measurement data value generated or captured in response to occurrence of a transaction such as a purchase or sale of a commodity of any type, generated by a device such as in response to an interaction by a user with the device, etc.

The plurality of event publishing systems 102 publishes the sensor measurements to ESP device 104. ESP device 104 receives the sensor measurements in an event stream and identifies an incident by comparing reference signatures to the sensor measurement values included in the event stream. Reference incidents determination device 106 may determine and/or store the reference signatures. When an incident is identified, ESP device 104 may quantify the incident before sending information concerning the incident to one or more of the plurality of incident information subscribing systems 108. ESP device 104 further may detect occurrence of the incident prior to identifying the incident so that not all of the sensor measurements are compared to the reference signatures. The plurality of incident information subscribing systems 108 may include an incident database, a system control operator display system, an automatic control system, a post-incident analysis device, an incident notification device, etc.

Occurrence of an incident does not necessarily indicate that there is a problem or that one will develop in the system to which the sensor is associated. Occurrence of the incident may indicate an abnormal or unexpected sensor measurement. The system may be designed to perform properly despite occurrence of some types of incidents by automatically responding to or recovering from the incident without intervention or by continuing operation without change; whereas, other types of incidents may indicate a need to intervene either under control of an operator or by an automatic control system. Occurrence of some types of incidents may be used to predict an equipment failure in the future. Some types of incidents may be environmentally based (e.g., a lightning strike, a tree falling, high wind, a flood, a fire, heat, humidity, etc.), while other types of incidents may be due to age, use, defect, or an non-environmentally based occurrence, etc. Identifying the type of incident when it occurs allows non-consequential incidents to be safely ignored while allowing additional response time when consequential incidents occur.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of communication devices.

Figure 2:
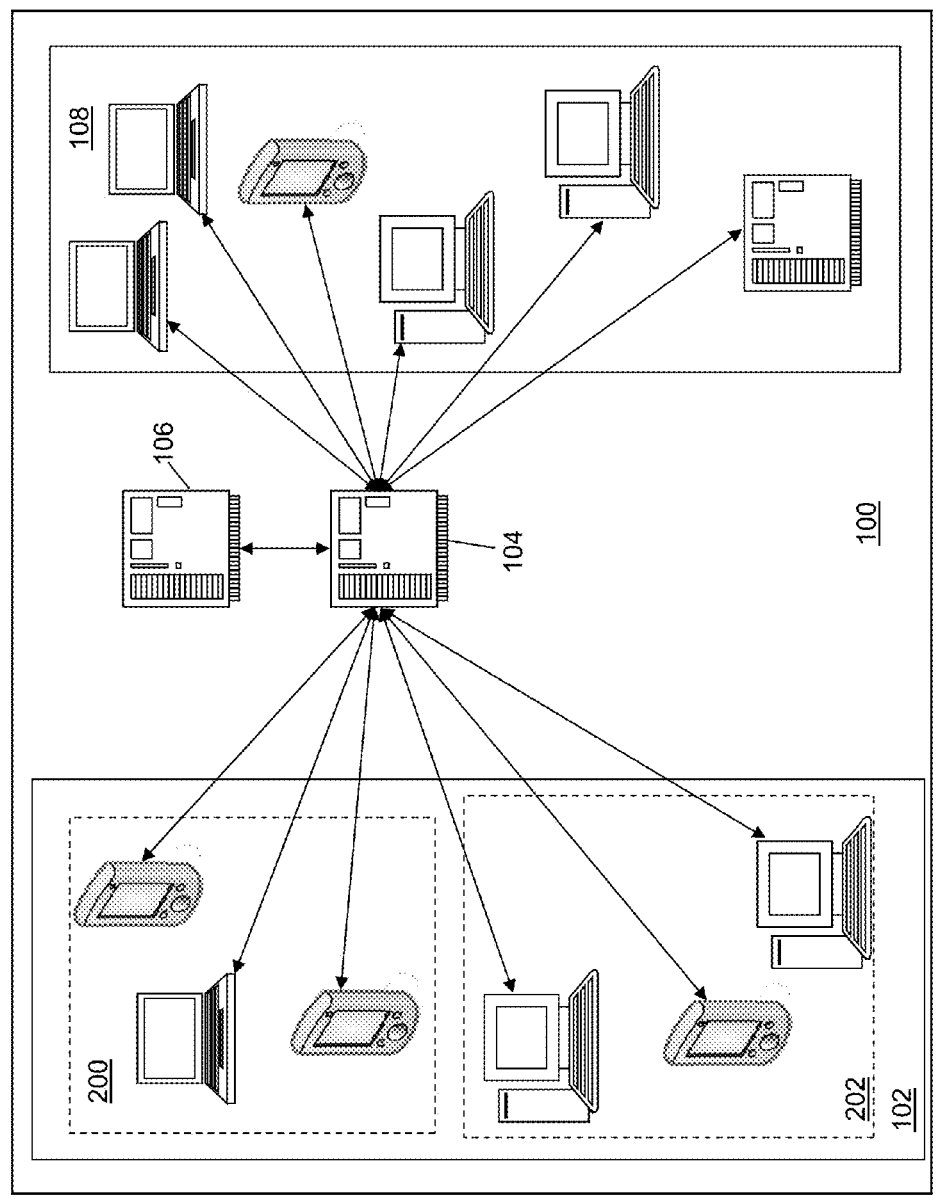
FIG. 2 depicts a connectivity diagram of the stream processing system of FIG. 1 in accordance with an illustrative embodiment.

The one or more computing devices of the plurality of event publishing systems 102 may include computers of any form factor such as a server computer 112, a desktop 114, a smart phone 116, a laptop 118, a personal digital assistant, an integrated messaging device, a tablet computer, etc. Referring to FIG. 2, the plurality of event publishing systems 102 can include any number and any combination of form factors of computing devices that may be organized into subnets such as a first subnet 200 and a second subnet 202. The computing devices of the plurality of event publishing systems 102 send and receive signals through network 110 to/from another of the one or more computing devices of the plurality of event publishing systems 102, and/or to/from ESP device 104. The one or more computing devices of the plurality of event publishing systems 102 may communicate using various transmission media that may be wired and/or wireless as understood by those skilled in the art.

ESP device 104 can include any form factor of computing device. For illustration, FIGS. 1 and 2 represent ESP device 104 as a server computer. In general, a server computer may include faster processors, additional processors, more disk memory, and more random access memory (RAM) than a client computer and support multi-threading as understood by a person of skill in the art. ESP device 104 sends and receives signals through network 110 to/from the plurality of event publishing systems 102 and/or to/from reference incidents determination device 106 and/or to/from the plurality of incident information subscribing systems 108. ESP device 104 may communicate using various transmission media that may be wired and/or wireless as understood by those skilled in the art. ESP device 104 may be implemented on a plurality of computing devices of the same or different type. Stream processing system 100 further may include a plurality of ESP devices. For example, ESP device 104 may subscribe to a first event stream published by a first ESP device and publish a second event stream, for example, to one or more of the plurality of incident information subscribing systems 108. For further illustration, the first ESP device may be associated with each of the plurality of event publishing systems 102 or with each of first subnet 200 and of second subnet 202.

Reference incidents determination device 106 can include any form factor of computing device. For illustration, FIGS. 1 and 2 represent reference incidents determination device 106 as a server computer. Reference incidents determination device 106 sends and receives signals through network 110 to/from ESP device 104. Reference incidents determination device 106 may communicate using various transmission media that may be wired and/or wireless as understood by those skilled in the art.

Referring to FIG. 1, the one or more computing devices of the plurality of incident information subscribing systems 108 may include computers of any form factor such as a smart phone 120, a desktop 122, a server computer 124, a laptop 126, a personal digital assistant, an integrated messaging device, a tablet computer, etc. As shown referring to FIG. 2, the plurality of incident information subscribing systems 108 can include any number and any combination of form factors of computing devices. The computing devices of the plurality of incident information subscribing systems 108 send and receive signals through network 110 to/from ESP device 104. The one or more computing devices of the plurality of incident information subscribing systems 108 may communicate using various transmission media that may be wired and/or wireless as understood by those skilled in the art.

Figure 3:
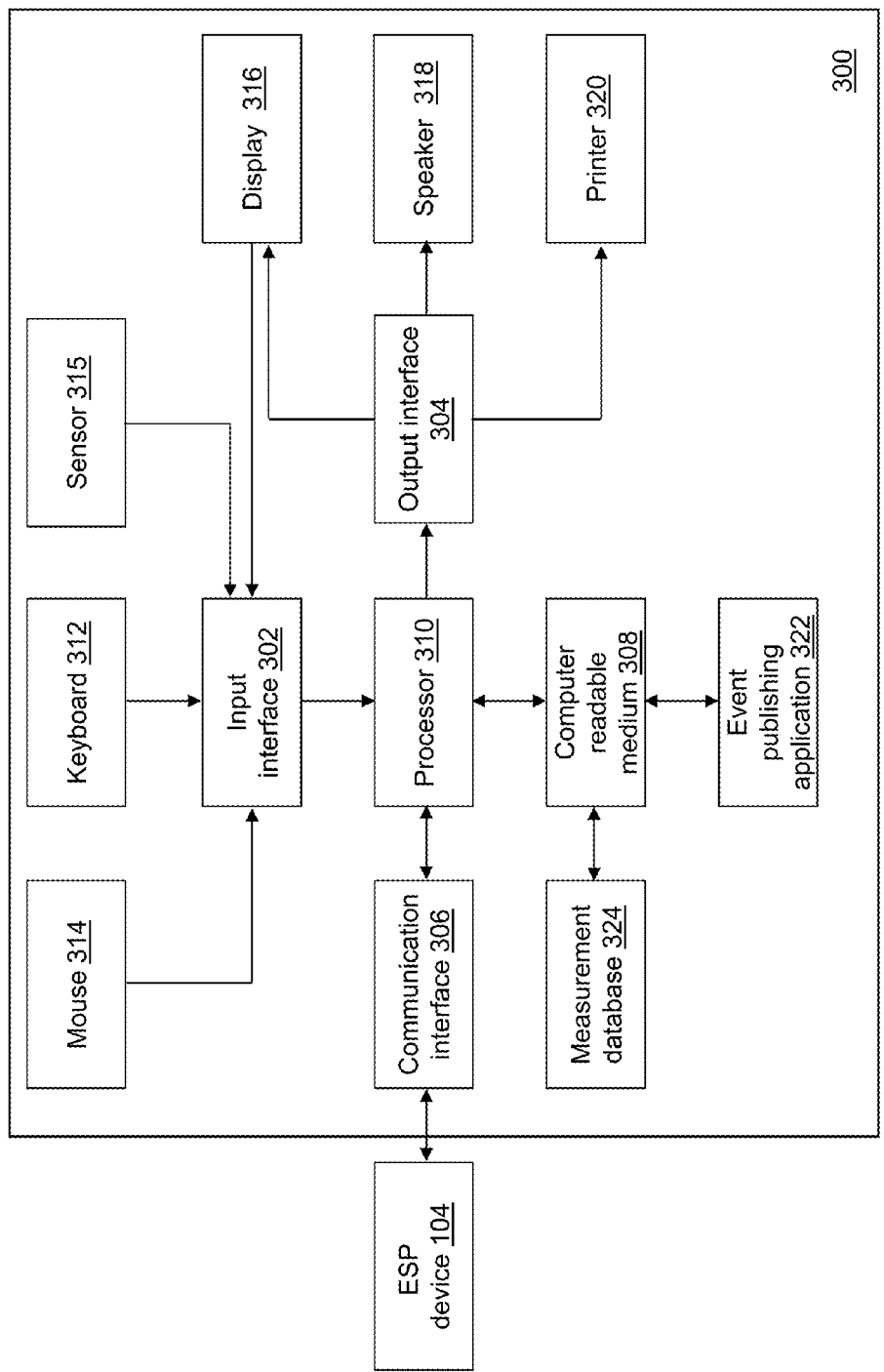
FIG. 3 depicts an event publishing device of the stream processing system of FIG. 1 in accordance with an illustrative embodiment.

Referring to FIG. 3, a block diagram of an event publishing device 300 is shown in accordance with an example embodiment. Event publishing device 300 is an example computing device of the plurality of event publishing systems 102. For example, each of server computer 112, desktop 114, smart phone 116, and laptop 118 is an instance of event publishing device 300. Event publishing device 300 may include an input interface 302, an output interface 304, a communication interface 306, a computer-readable medium 308, a processor 310, an event publishing application 322, and measurement database 324. Fewer, different, and additional components may be incorporated into event publishing device 300. The event publishing systems 102 may be geographically dispersed from each other and/or co-located. Each event publishing device 300 of the event publishing systems 102 may include the same or different components and combinations of components.

Input interface 302 provides an interface for receiving information for entry into event publishing device 300 as understood by those skilled in the art. Input interface 302 may interface with various input technologies including, but not limited to, a keyboard 312, a mouse 314, a display 316, a track ball, a keypad, one or more buttons, etc. to allow the user to enter information into event publishing device 300 or to make selections presented in a user interface displayed on the display. Input interface 302 further may interface with a sensor 315 to receive and to store measurement data obtained by sensor 315 in measurement database 324. Input interface 302 further may interface with a plurality of sensors of the same or different type. The same interface may support both input interface 302 and output interface 304. For example, a display comprising a touch screen both allows user input and presents output to the user. Event publishing device 300 may have one or more input interfaces that use the same or a different input interface technology. The input interface technology further may be accessible by event publishing device 300 through communication interface 306.

Output interface 304 provides an interface for outputting information for review by a user of event publishing device 300. For example, output interface 304 may interface with various output technologies including, but not limited to, display 316, a speaker 318, a printer 320, etc. Event publishing device 300 may have one or more output interfaces that use the same or a different interface technology. The output interface technology further may be accessible by event publishing device 300 through communication interface 306.

Communication interface 306 provides an interface for receiving and transmitting data between devices using various protocols, transmission technologies, and media as understood by those skilled in the art. Communication interface 306 may support communication using various transmission media that may be wired and/or wireless. Event publishing device 300 may have one or more communication interfaces that use the same or a different communication interface technology. For example, event publishing device 300 may support communication using an Ethernet port, a Bluetooth antenna, a telephone jack, a USB port, etc. Data and messages may be transferred between event publishing device 300 and ESP device 104 using communication interface 306.

Computer-readable medium 308 is an electronic holding place or storage for information so the information can be accessed by processor 310 as understood by those skilled in the art. Computer-readable medium 308 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Event publishing device 300 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Event publishing device 300 also may have one or more drives that support the loading of a memory media such as a CD or DVD, an external hard drive, etc. One or more external hard drives further may be connected to event publishing device 300 using communication interface 106.

Processor 310 executes instructions as understood by those skilled in the art. The instructions may be carried out by a special purpose computer, logic circuits, or hardware circuits. Processor 310 may be implemented in hardware and/or firmware. Processor 310 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 310 operably couples with input interface 302, with output interface 304, with communication interface 306, and with computer-readable medium 308 to receive, to send, and to process information. Processor 310 may retrieve a set of instructions from a permanent memory device and copy the instructions in an executable form to a temporary memory device that is generally some form of RAM. Event publishing device 300 may include a plurality of processors that use the same or a different processing technology.

Event publishing application 322 performs operations associated with generating and/or receiving measurement data from sensor 315 and publishing the measurement data in an event stream to ESP device 104 directly or indirectly through an intermediate device such as the first ESP device. The operations may be implemented using hardware, firmware, software, or any combination of these methods. Referring to the example embodiment of FIG. 3, event publishing application 322 is implemented in software (comprised of computer-readable and/or computer-executable instructions) stored in computer-readable medium 308 and accessible by processor 310 for execution of the instructions that embody the operations of event publishing application 322. Event publishing application 322 may be written using one or more programming languages, assembly languages, scripting languages, etc.

Event publishing application 322 may be implemented as a Web application. For example, event publishing application 322 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

As used herein, measurement database 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Measurement database 324 may be implemented using various formats as known to those skilled in the art including a file system, a relational database, a system of tables, a structured query language database, etc. For example, measurement database 324 may be stored in a cube distributed across a grid of computers as understood by a person of skill in the art. As another example, measurement database 324 may be stored in a multi-node Hadoop® cluster, as understood by a person of skill in the art. Apache™ Hadoop®, for example, is an open-source software framework for distributed computing supported by the Apache Software Foundation. As another example, measurement database 324 may be stored in a cloud of computers and accessed using cloud computing technologies, as understood by a person of skill in the art.

Figure 4:
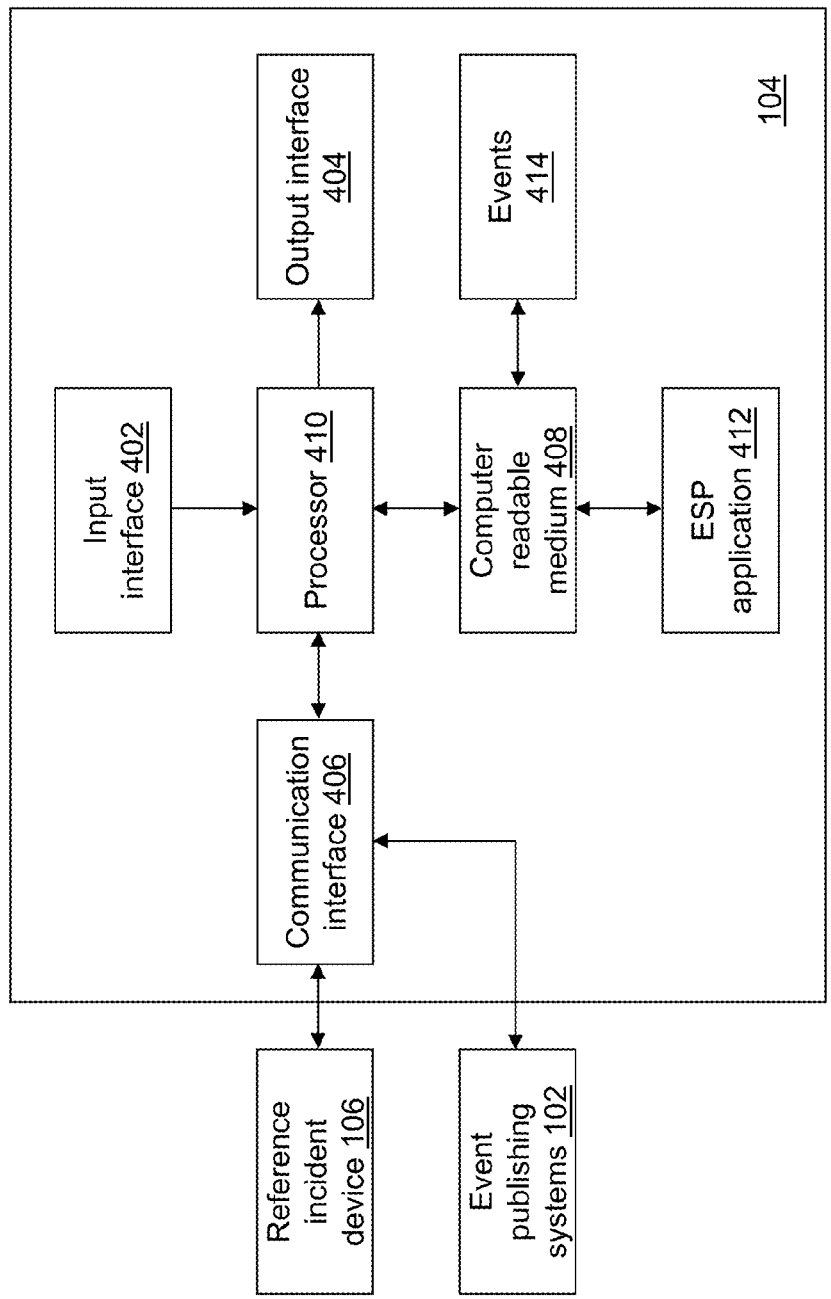
FIG. 4 depicts an event stream processing (ESP) device of the stream processing system of FIG. 1 in accordance with an illustrative embodiment.

Referring to FIG. 4, a block diagram of ESP device 104 is shown in accordance with an illustrative embodiment. ESP device 104 may include a second input interface 402, a second output interface 404, a second communication interface 406, a second computer-readable medium 408, a second processor 410, an ESP application 412, and events 414. Fewer, different, or additional components may be incorporated into ESP device 104.

Second input interface 402 provides the same or similar functionality as that described with reference to input interface 302 of event publishing device 300 though referring to ESP device 104. Second output interface 404 provides the same or similar functionality as that described with reference to output interface 304 of event publishing device 300 though referring to ESP device 104. Second communication interface 406 provides the same or similar functionality as that described with reference to communication interface 306 of event publishing device 300 though referring to ESP device 104. Data and messages may be transferred between ESP device 104 and the plurality event publishing systems 102, reference incidents determination device 106, and/or the plurality of incident information subscribing systems 108 using second communication interface 406. Second computer-readable medium 408 provides the same or similar functionality as that described with reference to computer-readable medium 308 of event publishing device 300 though referring to ESP device 104. Second processor 410 provides the same or similar functionality as that described with reference to processor 310 of event publishing device 300 though referring to ESP device 104.

ESP device 104 receives events 414 that include measurement data received from the event publishing systems 102. Second computer-readable medium 408 may provide the electronic storage medium for events 414.

ESP application 412 performs operations associated with coordinating and controlling the performance of analytics on events 414 streamed from the plurality of event publishing systems 102 and with sending the processed event data to the plurality of incident information subscribing systems 108 based on a subscription request. ESP application 412 may embed an ESP engine (ESPE) with its own dedicated thread pool or pools into its application space where the main application thread can do application-specific work, and the ESPE processes event streams at least by creating an instance of a model into processing objects. The operations may be implemented using hardware, firmware, software, or any combination of these methods. Referring to the example embodiment of FIG. 4, ESP application 412 is implemented in software (comprised of computer-readable and/or computer-executable instructions) stored in second computer-readable medium 408 and accessible by second processor 410 for execution of the instructions that embody the operations of ESP application 412. ESP application 412 may be written using one or more programming languages, assembly languages, scripting languages, etc. ESP application 412, for example, may be implemented as a Web application. For illustration, ESP application 412 may be the SAS® Event Stream Processing Engine developed and provided by SAS Institute Inc. of Cary, N.C., USA.

Figure 5:
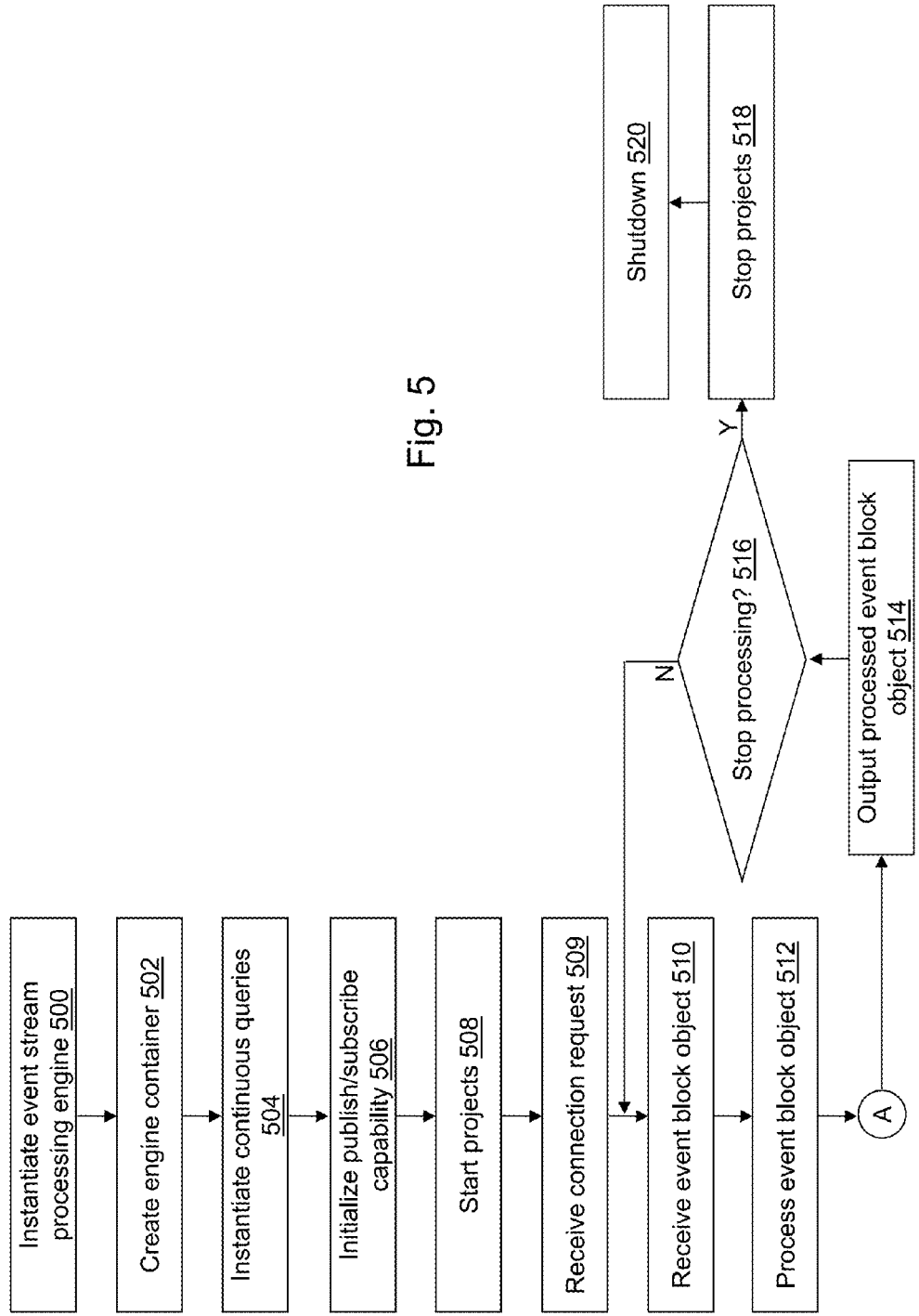
FIG. 5 depicts a flow diagram illustrating examples of operations performed by the ESP device of FIG. 4 in accordance with an illustrative embodiment.

Referring to FIG. 5, example operations associated with ESP application 412 are described. ESP application 412 defines how incoming event streams from the event publishing systems 102 (events 414) are transformed into meaningful outgoing event streams consumed by the plurality of incident information subscribing systems 108. Additional, fewer, or different operations may be performed depending on the embodiment. The order of presentation of the operations of FIG. 5 is not intended to be limiting. A user can interact with one or more user interface windows presented to the user in a display under control of ESP application 412 independently or through a browser application in an order selectable by the user. Although some of the operational flows are presented in sequence, the various operations may be performed in various repetitions, concurrently, and/or in other orders than those that are illustrated. For example, a user may execute ESP application 412, which causes presentation of a first user interface window, which may include a plurality of menus and selectors such as drop down menus, buttons, text boxes, hyperlinks, etc. associated with ESP application 412 as understood by a person of skill in the art. As further understood by a person of skill in the art, various operations may be performed in parallel, for example, using a plurality of threads.

Figure 6:
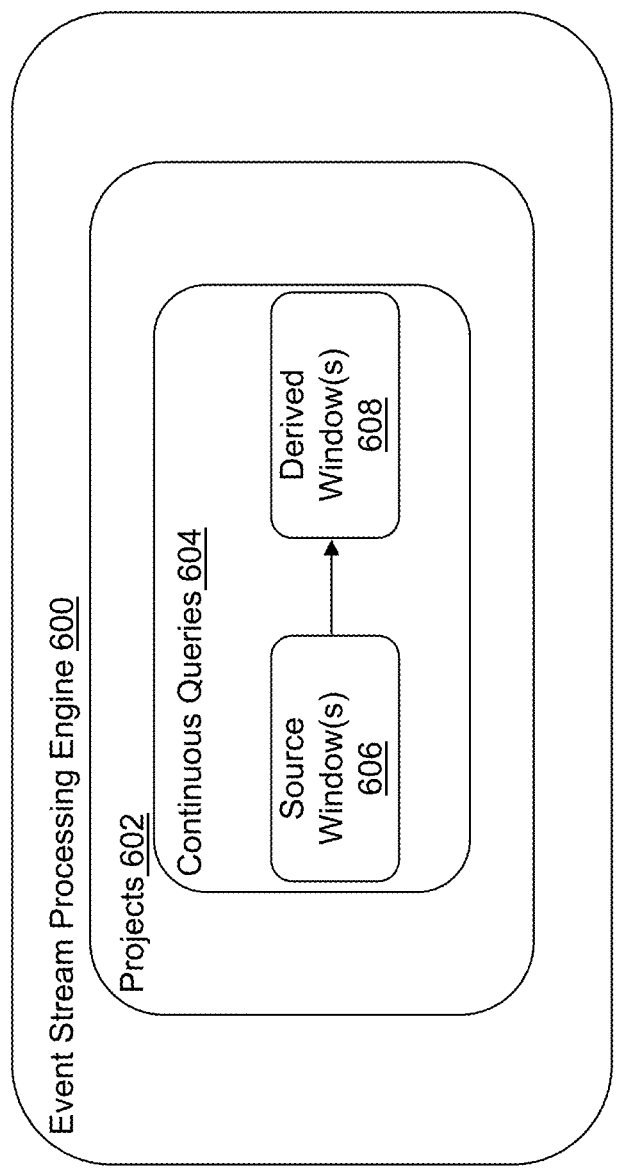
FIG. 6 depicts a block diagram of an ESP engine executing at the ESP device of FIG. 4 in accordance with an illustrative embodiment.

In an operation 500, ESP application 412 defines and starts an ESP engine (ESPE) thereby instantiating an ESPE at ESP device 104. For example, referring to FIG. 6, the components of an ESPE 600 executing at ESP device 104 are shown in accordance with an illustrative embodiment. ESPE 600 may include one or more projects 602. A project may be described as a second-level container in an engine model managed by ESPE 600 where a thread pool size for the project may be defined by a user. A value of 1 for the thread pool size indicates that writes are single-threaded. Each project of the one or more projects 602 may include one or more continuous queries 604 that contain data flows, which are data transformations of incoming event streams. The one or more continuous queries 604 may include one or more source windows 606 and one or more derived windows 608.

The engine container is the top-level container in a model that manages the resources of the one or more projects 602. In an illustrative embodiment, for example, there is a single ESPE 600 for each instance of ESP application 412, and ESPE 600 has a unique engine name. Additionally, the one or more projects 602 may each have unique project names, and each query may have a unique continuous query name and begin with a uniquely named source window of the one or more source windows 606. ESPE 600 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 606 and the one or more derived windows 608 represent continuously executing queries that generate updates to a query result set as new event blocks stream through ESPE 600. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 600 can support operation codes (opcodes) for events including insert, update, upsert, and delete. Upsert opcodes update the event if the key field already exists; otherwise, the event is inserted. For illustration, an event object may be a packed binary representation of one or more sensor measurements and may include both metadata and measurement data associated with a timestamp value. The metadata may include an opcode indicating if the event represents an insert, update, delete, or upsert, a set of flags indicating if the event is a normal, partial-update, or a retention generated event from retention policy management, and a set of microsecond timestamps. For example, the set of microsecond timestamps may indicate a sensor data generation time, a data receipt time by event publishing device 300, a data transmit time by event publishing device 300, a data receipt time by ESP device 104, etc.

An event block object may be described as a grouping or package of one or more event objects. An event stream may be described as a flow of event block objects. A continuous query of the one or more continuous queries 604 transforms the incoming event stream made up of streaming event block objects published into ESPE 600 into one or more outgoing event streams using the one or more source windows 606 and the one or more derived windows 608. A continuous query can also be thought of as data flow modeling.

The one or more source windows 606 are at the top of the directed graph and have no windows feeding into them. Event streams are published into the one or more source windows 606, and from there, the event streams are directed to the next set of connected windows as defined by the directed graph. The one or more derived windows 608 are all instantiated windows that are not source windows and that have other windows streaming events into them. The one or more derived windows 608 perform computations or transformations on the incoming event streams. The one or more derived windows 608 transform event streams based on the window type (that is operators such as join, filter, compute, aggregate, copy, pattern match, procedural, union, etc.) and window settings. As event streams are published into ESPE 600, they are continuously queried, and the resulting sets of derived windows in these queries are continuously updated.

ESP application 412 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 412 to embed ESPE 600 possibly with dedicated thread pools into its own process space. Alternatively, ESPE 600 can be embedded into the process space of an existing or a new application. In that case, a main application thread is focused on its own chores and interacts with the embedded ESPE 600 as needed.

Referring to FIG. 5, in an operation 502, the engine container is created. For illustration, ESPE 600 may be instantiated using a function call that specifies the engine container as a manager for the model. The function call may include the engine name for ESPE 600 that is provided by a user or a developer and may be unique to ESPE 600.

In an operation 504, the one or more continuous queries 604 are instantiated by ESPE 600 as a model. The one or more continuous queries 604 may be instantiated with a dedicated thread pool or pools that generate updates as new event block objects stream through ESPE 600. For illustration, the one or more continuous queries 604 may be created to model one or more of an incident detection, identification, and quantification process based on sensor measurement data monitoring and management.

To create a continuous query, input event structures that are schemas with keys that flow into the one or more source windows 606 may be identified. Output event structures that are also schemas with keys generated by the one or more source windows 606 and/or the one or more derived windows 608 may also be identified. For example, the block of code below illustrates creation of a compute window that normalizes a "City" field that is created for events in that window:

```
dfESPwindow_source *sw;
sw=contQuery→newWindow_source("sourceWindow",
    depot,
    dfESPindextypes::pi_HASH,
    dfESPstring("name:string,ID*:int32,city:string"));
dfESPschema *sw_schema=sw→getSchema( );
dfESPwindow_compute *cw;
cw=contQuery→newWindow_compute("computeWin-
    dow", depot,
    dfESPindextypes::pi_HASH,
    dfESPstring("ID*:int32,name:string,oldCity:string,
        newCity:string"));
// Register the non-key field calculation expressions.
    cw→addNonKeyFieldCalc("name");  // pass name
        through unchanged
    cw→addNonKeyFieldCalc("city");  // pass city through
        unchanged
// Run city through the blue fusion standardize function.
    char newCity[1024]="bluefusion bf\r\n";
    strcat(newCity, "String result\r\n");
    strcat(newCity, "bf=bluefusion_initialize( )\r\n");
    strcat(newCity, "if (isnull(bf)) then\r\n");
    strcat(newCity, "print(bf.getlasterror( ))\r\n");
    strcat(newCity, "if (bf.loadqkb(\"ENUSA\")==0)
        then\r\n");
    strcat(newCity, "print(bf.getlasterror( ))\r\n");
    strcat(newCity, "if (bf.standardize(\"City\",city,result)
        ==0) then\r\n");
    strcat(newCity, "print(bf.getlasterror( ))\r\n");
    strcat(newCity, "return result");
    cw→addNonKeyFieldCalc(newCity);
// Add the subscriber callbacks to the windows
    cw→addSubscriberCallback(winSubscribe_compute);
// Add window connectivity
    contQuery→addEdge(sw, 0, cw);
// create and start the project
    project→setNumThreads(2);
    myEngine→startProjects( );
// declare variables to build up the input data.
    dfESPptrVect<dfESPeventPtr>trans;
    dfESPevent *p;
// Insert multiple events
    p=new dfESPevent(sw_schema,(char *)"i,n,Jerry, 1111,
        apex");
    trans.push_back(p);
    p=new dfESPevent(sw_schema,(char *)"i,n,Scott, 1112,
        caryy");
    trans.push_back(p);
    p=new dfESPevent(sw_schema,(char *)"i,n,someone,
        1113, rallleigh");
    trans.push_back(p);
    dfESPeventblockPtr   ib=dfESPeventblock::newEvent-
        Block(&trans, dfESPeventblock::ebt_TRANS);
    project→injectData(contQuery, sw, ib);
```

ESPE 600 may analyze and process events in motion or event streams. Instead of storing events 414 and running queries against the stored events 414, ESPE 600 may store queries and stream events 414 through them to allow continuous analysis of data as it is received. The one or more source windows 606 and the one or more derived windows 608 may be created based on the relational, pattern matching, and procedural algorithms that transform the input event streams into the output event streams to model, simulate, score, test, predict, etc. based on the continuous query model defined and application to the streamed data.

In an operation 506, a publish/subscribe (pub/sub) capability is initialized for ESPE 600. In an illustrative embodiment, a pub/sub capability is initialized for each project of the one or more projects 602. To initialize and enable pub/sub capability for ESPE 600, a port number is provided. Pub/sub clients can use a host name of ESP device 104 and the port number to establish pub/sub connections to ESPE 600. For example, a server listener socket is opened for the port number to enable the plurality of event publishing systems 102, reference incidents determination device 106, and the plurality of incident information subscribing systems 108 to connect to ESPE 600 for publish/subscribe services. The host name of ESP device 104 and the port number to establish pub/sub connections to ESPE 600 may be referred to as the host:port designation of ESPE 600 executing at ESP device 104.

Publish-subscribe is a message-oriented interaction paradigm based on indirect addressing. Processed data recipients (the plurality of incident information subscribing systems 108) specify their interest in receiving information from ESPE 600 by subscribing to specific classes of events, while information sources (the plurality of event publishing systems 102) publish events to ESPE 600 without directly addressing the data recipients. ESPE 600 coordinates the interactions and processes events 414. In some cases, the data source receives confirmation that the published information has been received by a data recipient.

A publish/subscribe API may be described as a library that enables an event publisher, such as event publishing device 300, to publish event streams into ESPE 600 or an event subscriber to subscribe to event streams from ESPE 600. For illustration, one or more publish/subscribe APIs may be defined. As an example, a version of the SAS® ESP Engine offered by SAS Institute Inc. can provide a C++ publish/subscribe API and a Java publish/subscribe API. Using the publish/subscribe API, event publishing application 322 may publish event streams into a running event stream processor project source window of ESPE 600, and a subscribing device of the plurality of incident information subscribing systems 108 may subscribe to a project source window of ESPE 600. The publish/subscribe API provides cross-platform connectivity and endianness compatibility between ESP application 412 and other networked applications.

Referring again to FIG. 5, operation 506 initializes the publish/subscribe capability of ESPE 600. In an operation 508, the one or more projects 602 are started. The one or more started projects may run in the background on ESP device 104. In an operation 509, a connection request is received from a computing device of the event publishing systems 102, for example, from event publishing device 300, for a source window to which data will be published.

In an operation 510, an event block object is received from one or more computing devices of the event publishing systems 102, for example, from event publishing device 300. An event block object containing one or more event objects is injected into a source window of the one or more source windows 606 from an instance of event publishing application 322. The unique ID assigned to the event block object by event publishing device 300 is maintained as the event block object is passed between the one or more source windows 606 and/or the one or more derived windows 608 of ESPE 600. A unique embedded transaction ID further may be embedded in the event block object as the event block object is processed by a continuous query. The received event block objects may be stored as events 414, for example, in a RAM or cache type of second computer-readable medium 408.

In an operation 512, the event block object is processed through the one or more continuous queries 604. For example, processing details are described below with reference to FIG. 13. In an operation 514, the processed event block object is output to one or more subscribing device of the plurality of incident information subscribing systems 108.

ESPE 600 maintains the event block containership aspect of the received event blocks from when the event block is published into a source window and works its way through the directed graph defined by the one or more continuous queries 604 with the various event translations before being output to subscribing devices. Subscribing devices can correlate a group of subscribed event block objects back to a group of published event block objects by comparing the unique ID of the event block object that a publisher, such as event publishing device 300, attached to the event block object with the event block ID received by the subscribing device.

In an operation 516, a determination is made concerning whether or not processing is stopped. If processing is not stopped, processing continues in operation 510 to continue receiving the one or more event streams containing event block objects from the one or more computing devices of the event publishing systems 102. If processing is stopped, processing continues in an operation 518. In operation 518, the started projects are stopped. In operation 520, ESPE 600 is shutdown.

Figure 7:
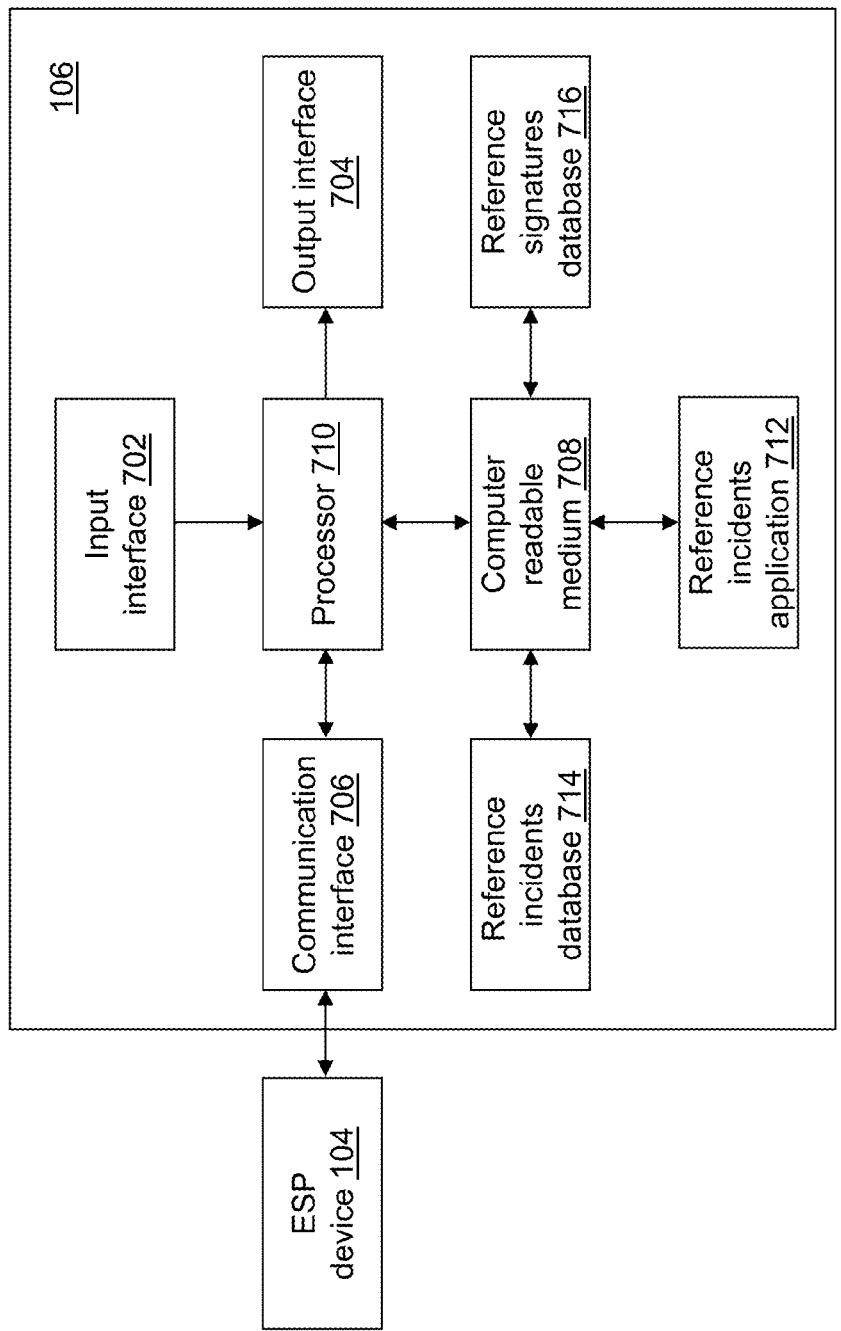
FIG. 7 depicts a reference incidents determination device of the stream processing system of FIG. 1 in accordance with an illustrative embodiment.

Referring to FIG. 7, a block diagram of reference incidents determination device 106 is shown in accordance with an example embodiment. Reference incidents determination device 106 may include a third input interface 702, a third output interface 704, a third communication interface 706, a third computer-readable medium 708, a third processor 710, a reference incidents application 712, a reference incidents database 714, and a reference signatures database 716. Fewer, different, and additional components may be incorporated into reference incidents determination device 106.

Third input interface 702 provides the same or similar functionality as that described with reference to input interface 302 of event publishing device 300 though referring to reference incidents determination device 106. Third output interface 704 provides the same or similar functionality as that described with reference to output interface 304 of event publishing device 300 though referring to reference incidents determination device 106. Third communication interface 706 provides the same or similar functionality as that described with reference to communication interface 306 of event publishing device 300 though referring to reference incidents determination device 106. Data and messages may be transferred between reference incidents determination device 106 and ESP device 104 using third communication interface 706. Third computer-readable medium 708 provides the same or similar functionality as that described with reference to computer-readable medium 308 of event publishing device 300 though referring to reference incidents determination device 106. Third processor 710 provides the same or similar functionality as that described with reference to processor 310 of event publishing device 300 though referring to reference incidents determination device 106.

Figure 12:
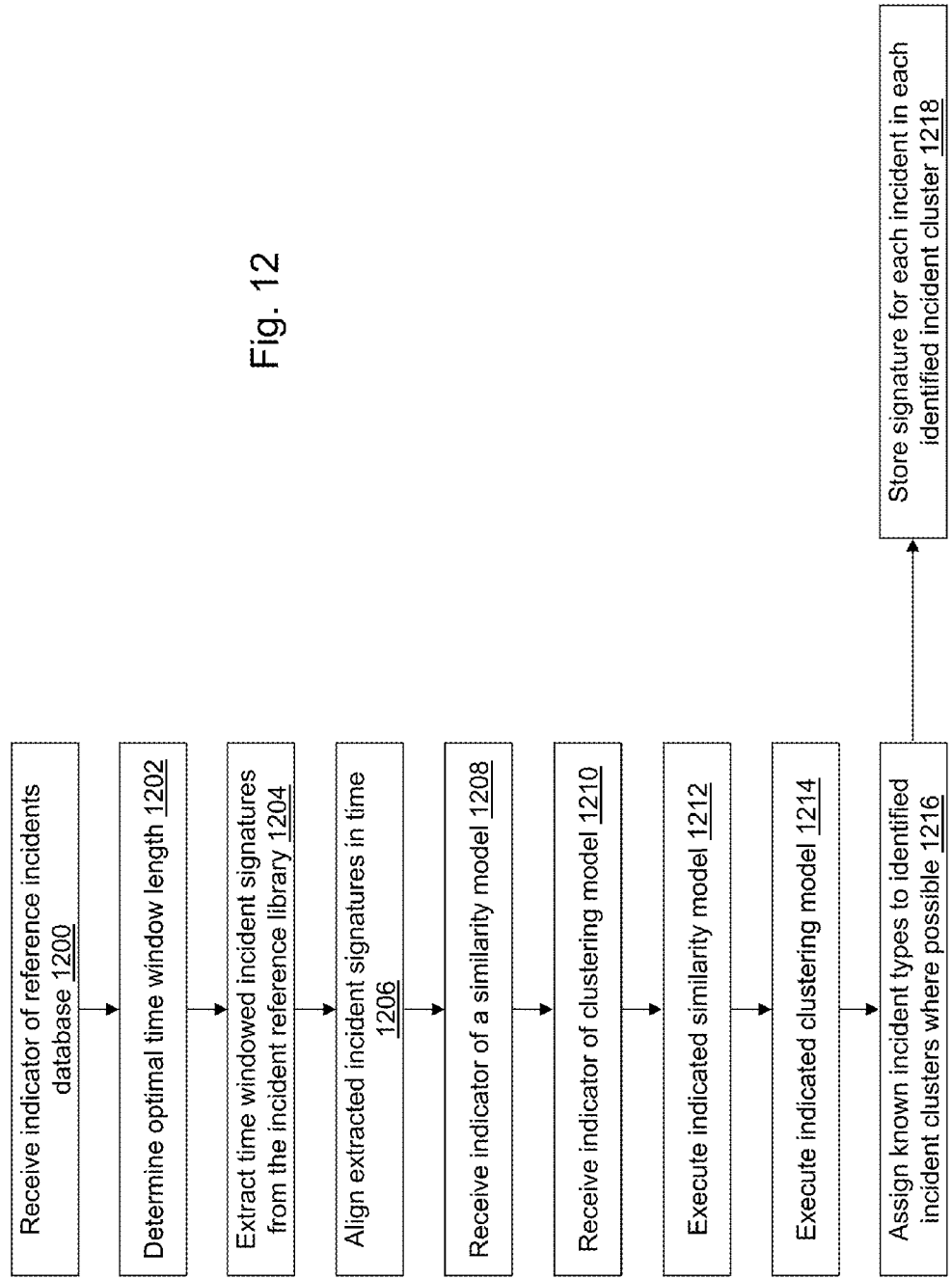
FIG. 12 depicts flow diagrams illustrating examples of operations performed by the reference incidents determination device of FIG. 7 in accordance with an illustrative embodiment.

Reference incidents application 712 performs operations associated with creating reference incidents database 714 and selecting reference signatures for inclusion in reference signatures database 716 from incident data stored in reference incidents database 714. The operations may be implemented using hardware, firmware, software, or any combination of these methods. Referring to the example embodiment of FIG. 7, reference incidents application 712 is implemented in software (comprised of computer-readable and/or computer-executable instructions) stored in third computer-readable medium 708 and accessible by third processor 710 for execution of the instructions that embody the operations of reference incidents application 712. Reference incidents application 712 may be written using one or more programming languages, assembly languages, scripting languages, etc. Reference incidents application 712, for example, may be implemented as a Web application. Referring to FIG. 12, example operations associated with reference incidents application 712 are described.

Figure 8:
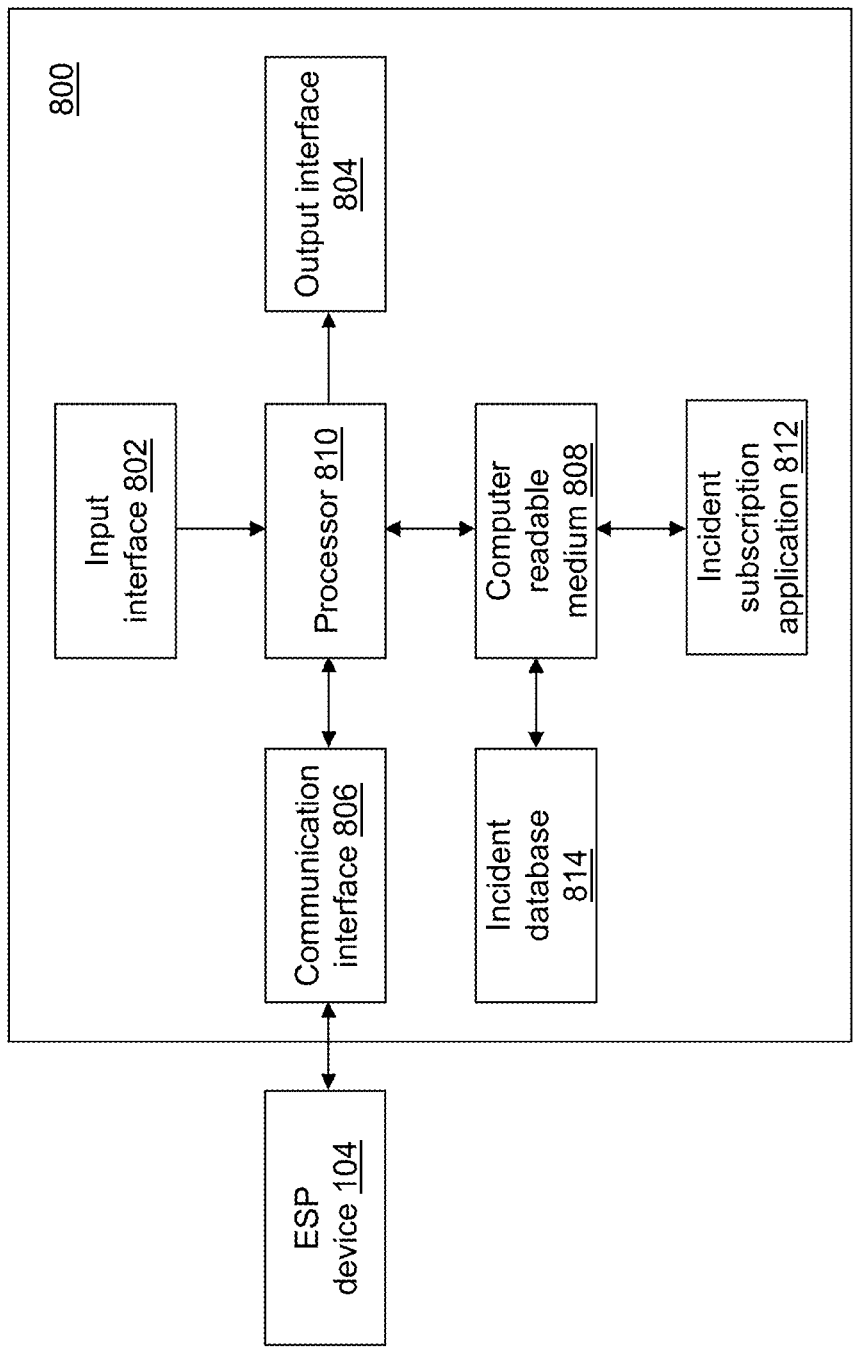
FIG. 8 depicts an incident information subscribing device of the stream processing system of FIG. 1 in accordance with an illustrative embodiment.

Referring to FIG. 8, a block diagram of an incident information subscribing device 800 is shown in accordance with an example embodiment. Incident information subscribing device 800 is an example computing device of the plurality of incident information subscribing systems 108. For example, each of smart phone 120, desktop 122, server computer 124, and laptop 126 is an instance of incident information subscribing device 800. Incident information subscribing device 800 may include a fourth input interface 802, a fourth output interface 804, a fourth communication interface 806, a fourth computer-readable medium 808, a fourth processor 810, an incident subscription application 812, and incident database 814. Fewer, different, and additional components may be incorporated into incident information subscribing device 800. The incident information subscribing systems 108 may be geographically dispersed from each other and/or co-located. Each incident information subscribing device 800 of the incident information subscribing systems 108 may include the same or different components or combination of components.

Fourth input interface 802 provides the same or similar functionality as that described with reference to input interface 302 of event publishing device 300 though referring to incident information subscribing device 800. Fourth output interface 804 provides the same or similar functionality as that described with reference to output interface 304 of event publishing device 300 though referring to incident information subscribing device 800. Fourth communication interface 806 provides the same or similar functionality as that described with reference to communication interface 306 of event publishing device 300 though referring to incident information subscribing device 800. Data and messages may be transferred between ESP device 104 and incident information subscribing device 800 using fourth communication interface 806. Fourth computer-readable medium 808 provides the same or similar functionality as that described with reference to computer-readable medium 308 of event publishing device 300 though referring to incident information subscribing device 800. Fourth processor 810 provides the same or similar functionality as that described with reference to processor 310 of event publishing device 300 though referring to incident information subscribing device 800.

Figure 9:
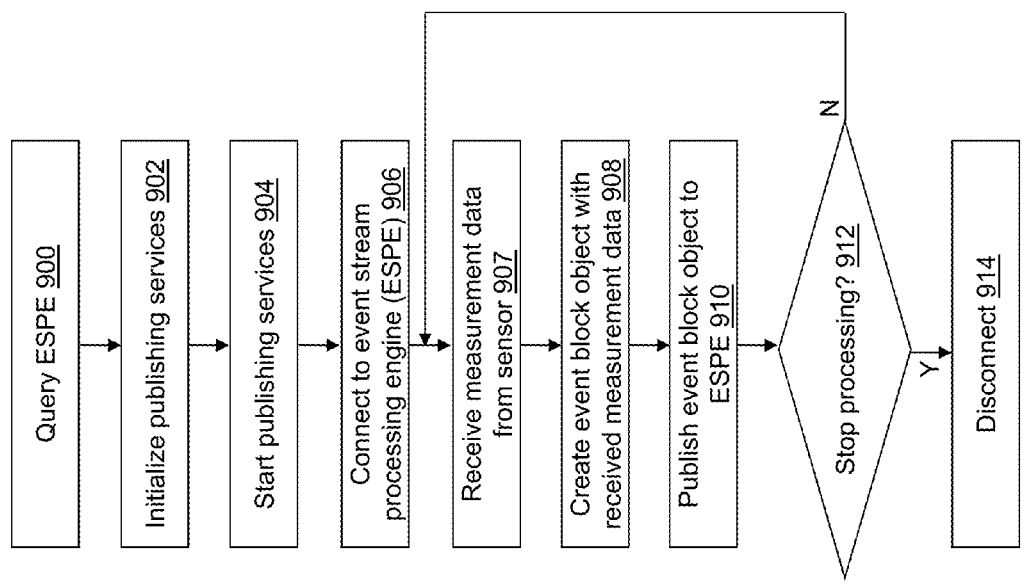
FIG. 9 depicts flow diagrams illustrating examples of operations performed by the event publishing device of FIG. 2 in accordance with an illustrative embodiment.

Referring to FIG. 9, example operations associated with event publishing application 322 are described. Additional, fewer, or different operations may be performed depending on the embodiment. The order of presentation of the operations of FIG. 9 is not intended to be limiting.

In an operation 900, ESPE 600 is queried, for example, to discover projects 602, continuous queries 604, windows 606,608, window schema, and window edges currently running in ESPE 600. The engine name and host/port to ESPE 600 may be provided as an input to the query and a list of strings may be returned with the names to the projects 602, to the continuous queries 604, to the windows 606,608, to the window schema, and/or to the window edges of currently running projects on ESPE 600. The host is associated with a host name or Internet Protocol (IP) address of ESP device 104. The port is the port number provided when the pub/sub capability is initialized by ESPE 600. The engine name is the name of ESPE 600. The engine name of ESPE 600 and host/port to ESP device 104 may be read from a storage location on computer-readable medium 308, may be provided on a command line, or otherwise input to or defined by event publishing application 322 as understood by a person of skill in the art.

In an operation 902, publishing services are initialized. In an operation 904, the initialized publishing services are started, which may create a publishing client for the instantiated event publishing application 322. The publishing client performs the various pub/sub activities for the instantiated event publishing application 322. For example, a string representation of a URL to ESPE 600 is passed to a "Start" function. For example, the URL may include the host:port designation of ESPE 600 executing at ESP device 104, a project of the projects 602, a continuous query of the continuous queries 604, and a window of the source windows 606. The "Start" function may validate and retain the connection parameters for a specific publishing client connection and return a pointer to the publishing client. For illustration, the URL may be formatted as "dfESP://<host>:<port>/<project name>/<continuous query name>/<window name>". If event publishing application 322 is publishing to more than one source window of ESPE 600, the initialized publishing services may be started to each source window using the associated names (project name, continuous query name, window name).

In an operation 906, a connection is made between event publishing application 322 and ESPE 600 for each source window to which data is published. To make the connection, the pointer to the created publishing client may be passed to a "Connect" function. If event publishing application 322 is publishing to more than one source window of ESPE 600, a connection may be made to each started window using the pointer returned for the respective "Start" function call.

In an operation 907, a measurement data value is received from sensor 315, for example, through communication interface 306 or input interface 302. In an operation 908, an event block object is created by event publishing application 322 that includes the received measurement data value and a time value associated with a time the measurement data value was generated by sensor 315. The measurement data value may be processed before inclusion in the event block object, for example, to change a unit of measure, convert to a different reference system, etc. The event block object may include a plurality of measurement data values measured at different times and/or by different sensors.

In an operation 910, the created event block object is published to ESPE 600 using the pointer returned for the respective "Start" function call to the appropriate source window. Event publishing application 322 passes the created event block object to the created publishing client, where the unique ID field in the event block object has been set by event publishing application 322 possibly after being requested from the created publishing client. In an illustrative embodiment, event publishing application 322 may wait to begin publishing until a "Ready" callback has been received from the created publishing client. The event block object is injected into the source window, continuous query, and project associated with the started publishing client.

In an operation 912, a determination is made concerning whether or not processing is stopped. If processing is not stopped, processing continues in operation 908 to continue creating and publishing event block objects that include measurement data. If processing is stopped, processing continues in an operation 914. In operation 914, the connection made between event publishing application 322 and ESPE 600 through the created publishing client is disconnected, and each started publishing client is stopped.

Figure 10:
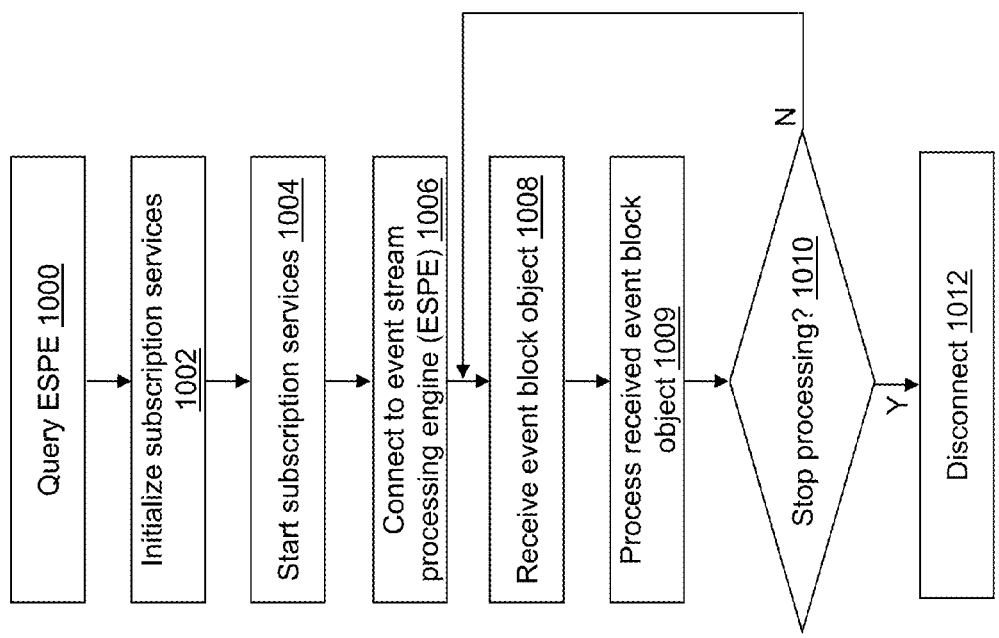
FIG. 10 depicts flow diagrams illustrating examples of operations performed by the incident information subscribing device of FIG. 8 in accordance with an illustrative embodiment.

Referring to FIG. 10, example operations associated with incident subscription application 812 are described. Additional, fewer, or different operations may be performed depending on the embodiment. The order of presentation of the operations of FIG. 10 is not intended to be limiting.

Similar to operation 900, in an operation 1000, ESPE 600 is queried, for example, to discover names of projects 602, of continuous queries 604, of windows 606,608, of window schema, and of window edges currently running in ESPE 600. The host name of ESP device 104, the engine name of ESPE 600, and the port number opened by ESPE 600 are provided as an input to the query and a list of strings may be returned with the names to the projects 602, continuous queries 604, windows 606,608, window schema, and/or window edges.

In an operation 1002, subscription services are initialized. In an operation 1004, the initialized subscription services are started, which may create a subscribing client on behalf of incident subscription application 812 at incident information subscribing device 800. The subscribing client performs the various pub/sub activities for incident subscription application 812. For example, a URL to ESPE 600 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1006, a connection is made between incident subscription application 812 and ESPE 600 through the created subscribing client. To make the connection, the pointer to the created subscribing client may be passed to a "Connect" function and a mostly non-busy wait loop created to wait for receipt of event block objects.

In an operation 1008, an event block object is received by incident subscription application 812. In an operation 1009, the received event block object is processed based on the operational functionality provided by incident subscription application 812. For example, incident subscription application 812 may extract incident data from the received event block object and store the extracted incident data in incident database 814. In addition, or in the alternative, incident subscription application 812 may extract incident data from the received event block object and send the extracted incident data to the system control operator display system, the automatic control system, and/or the incident notification device to respond as needed to the incident. In addition, or in the alternative, incident subscription application 812 may extract incident data from the received event block object and send the extracted incident data to the post-incident analysis device to further analyze the measurement data associated with the incident.

In an operation 1010, a determination is made concerning whether or not processing is stopped. If processing is not stopped, processing continues in operation 1008 to continue receiving event block objects. If processing is stopped, processing continues in an operation 1012. In operation 1012, the connection made between incident subscription application 812 and ESPE 600 through the subscribing client is disconnected, and the subscribing client is stopped.

Figure 11:
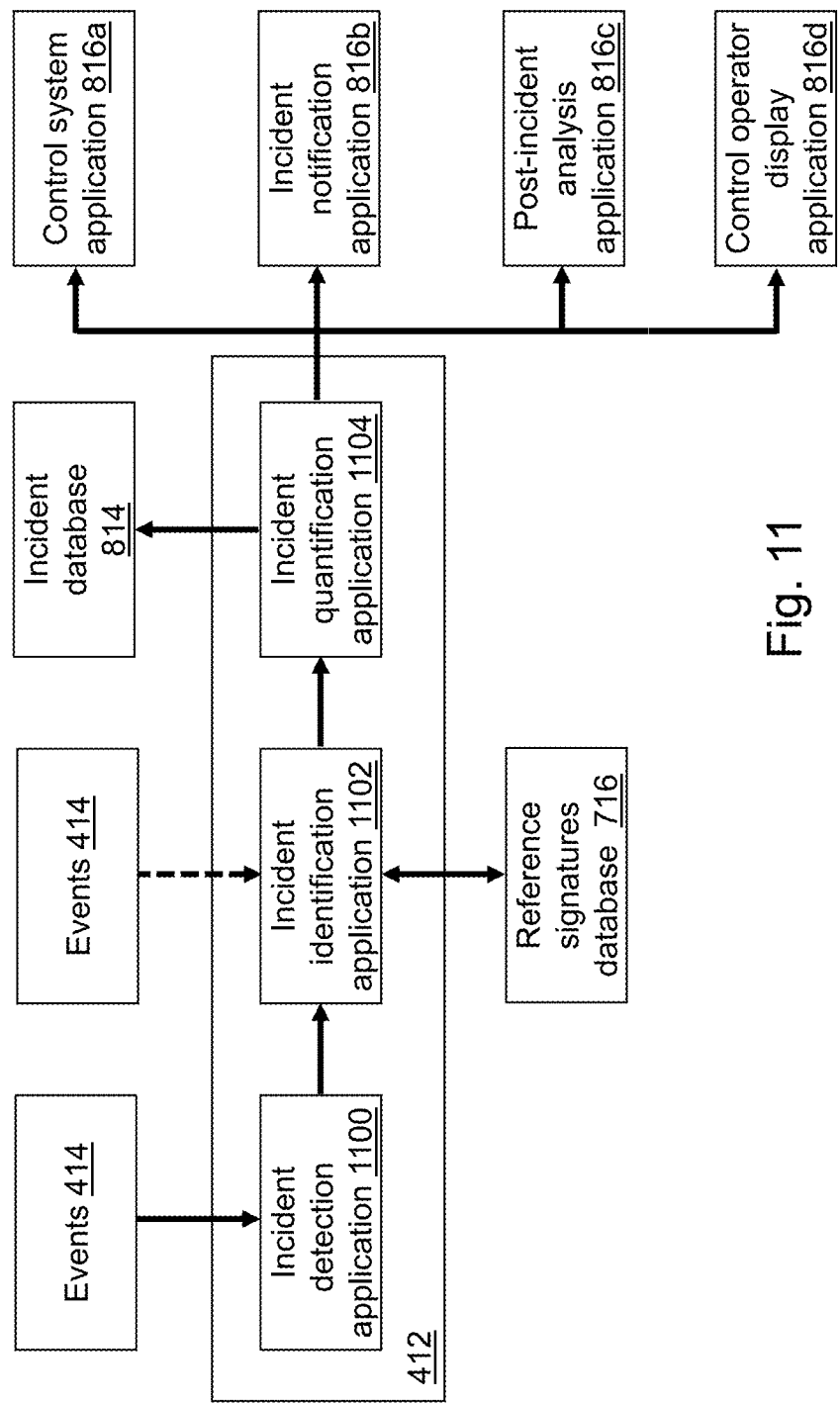
FIG. 11 depicts a block diagram illustrating interactions among the components of the stream processing system of FIG. 1 in accordance with an illustrative embodiment.

Referring to FIG. 11, a block diagram illustrating the interactions between the components of stream processing system 100 is shown in accordance with an illustrative embodiment. Events 414 are received by ESP device 104 from the event publishing systems 102. ESP application 412 may be configured to include incident detection application 1100, incident identification application 1102, and incident quantification application 1104. Incident detection application 1100 may be implemented by first continuous queries that connect to second continuous queries that perform incident identification application 1102 when an incident is detected. The second continuous queries that perform incident identification application 1102 connect to third continuous queries that perform incident quantification application 1104.

In some embodiments, ESP application 412 may not be configured to include incident detection application 1100. In these embodiments, events 414 may be input directly to the second continuous queries that perform incident identification application 1102. Incident identification application 1102 uses reference signatures stored in reference signatures database 716 to identify a type of incident. Incident quantification application 1104 provides the identified and quantified incidents to one or more of incident database 814, a control system application 816a, an incident notification application 816b, a post-incident analysis application 816c, a control operator display application 816d, etc.

Control system application 816a, incident notification application 816b, post-incident analysis application 816c, and control operator display application 816d may be separate or integrated applications. For example, the automatic control system may be executing operations associated with control system application 816a. The incident notification device may be executing operations associated with incident notification application 816b. The post-incident analysis device may be executing operations associated with post-incident analysis application 816c. The system control operator display system may be executing operations associated with control operator display application 816d. The automatic control system, the incident notification device, the post-incident analysis device, and the system control operator display system may be implemented in one or more computing devices.

Referring to FIG. 12, example operations associated with reference incidents application 712 are described. Additional, fewer, or different operations may be performed depending on the embodiment. The order of presentation of the operations of FIG. 12 is not intended to be limiting.

In an operation 1200, an indicator of reference incidents database 714 is received. The indicator indicates one or more user selections from a user interface, one or more data entries into a data field of the user interface, one or more data items read from third computer-readable medium 708 or otherwise defined with one or more default values, etc. that are received as an input by reference incidents application 712. For example, the indicator indicates a location of reference incidents database 714. As an example, the indicator may be received by reference incidents application 712 after selection from a user interface window or after entry by a user into a user interface window such as on a command line. In an alternative embodiment, reference incidents database 714 may not be selectable. For example, a most recently created data warehouse or database may be used automatically.

Reference incidents database 714 stores data from previous incidents that may have been determined using stream processing system 100. The previous incidents may have been detected from the real-time event stream, for example, using incident detection application 1100. Reference incidents database 714 and incident database 814 may be the same database. Reference incidents database 714 may include an incident signature for each of a plurality of incidents. Each incident signature may include an incident identifier, a plurality of measurement data observations as a function of time where each measurement data observation may include one or more timestamps, a measurement type, a measurement location, a measurement unit, a measurement value, a sensor identifier, etc. for one or more sensors.

Reference incidents database 714 may be implemented using various formats as known to those skilled in the art including a file system, a relational database, a system of tables, a structured query language database, etc. For example, reference incidents database 714 may be stored in a cube distributed across a grid of computers as understood by a person of skill in the art. As another example, reference incidents database 714 may be stored in a multi-node Hadoop® cluster, as understood by a person of skill in the art. Apache™ Hadoop®, for example, is an open-source software framework for distributed computing supported by the Apache Software Foundation. As another example, reference incidents database 714 may be stored in a cloud of computers and accessed using cloud computing technologies, as understood by a person of skill in the art. The SAS® LASR™ Analytic Server, for example, developed and provided by SAS Institute Inc. of Cary, N.C., USA may be used as an analytic platform to enable multiple users to concurrently access data stored in reference incidents database 714.

In an operation 1202, an optimal time window length is determined for each incident stored in reference incidents database 714. In alternative embodiments, a subset of incidents may be selected from reference incidents database 714 to determine the optimal time window length. The subset may be determined by the user. For example, the subset of incidents may include incidents for which an incident type has been identified. The optimal time window length may be determined using post-incident analysis application 816c. Post-incident analysis application 816c may determine the optimal time window length by minimizing non-incident information while capturing a sufficient amount of measurement data for the incident duration. The time window starts shortly before the incident, and typically continues until the incident has finished. The window may be long enough to identify the incident, but not necessarily the impact of the incident occurrence. For example, post-incident analysis may be performed by an engineer in the relevant domain (e.g. an electrical engineer for a power grid application) using post-incident analysis application 816c that may include a data visualization tool or a machine learning tool. SAS® Visual Statistics, developed and provided by SAS Institute Inc., Cary, N.C., USA, is an example data visualization tool. SAS® Enterprise Miner™, developed and provided by SAS Institute Inc., Cary, N.C., USA, is an example machine learning tool.

In an operation 1204, time windowed, incident signatures are extracted from reference incidents database 714. For example, for each incident stored in reference incidents database 714 (or the selected subset of incidents), a start time associated with the respective incident is used in combination with the determined optimal time window length to select the measurement data associated with the incident signature from reference incidents database 714. The extracted, time windowed, incident signatures may be stored separate from reference incidents database 714 in third computer-readable medium 708 or on another computer-readable medium accessible by reference incidents determination device 106.

In an operation 1206, the extracted, time windowed, incident signatures are aligned in time so that the start time for each incident is the same.

In an operation 1208, a second indicator of a similarity model is received. For example, the second indicator indicates a name of a type of similarity model and one or more configuration parameters associated with defining the similarity model. In other embodiments, the similarity model may not be selectable such that a default similarity model is used. For example, the SIMILARITY procedure or the TIMEDATA procedure from SAS®/ETS® 14.1 (developed and provided by SAS Institute Inc. of Cary, N.C., USA) may be used to compute a similarity between two time series. For illustration, the example code below uses the TIMEDATA procedure to compute a similarity between two time series.

data test;
input i y x;
run;
proc timedata data=test out=out2 outscalars=tsa_scalar2;
register tsa;
var x y;
outscalar measure;
rc=TSA_SIMILARITY(x, y, 'ABSDEV', 'NONE', 20,0, , , measure);
run;

The function TSA_SIMILARITY may be defined as TSA_SIMILARITY (x, y, type, scale, expandpct, expandabs, compresspct, compressabs, measure) with the arguments defined as:

INPUTS
  x—input time series to analyze, and
  y—target time series to analyze.
OPTIONAL INPUTS
  type—similarity measurement type, which may be selected from the following options:
    SQRDEV—squared deviation,
    ABSDEV—absolute deviation,
    MSQRDEV—mean squared deviation,
    MSQRDEVINP—mean squared deviation relative to a length of the input,
    MSQRDEVTAR—mean squared deviation relative to a length of the target,
    MSQRDEVMIN—mean squared deviation relative to a minimum valid path length,
    MSQRDEVMAX—mean squared deviation relative to a maximum valid path length,
    MABSDEV—mean absolute deviation,
    MABSDEVINP—mean absolute deviation relative to the length of the input
    MABSDEVTAR—mean absolute deviation relative to the length of the target,
    MABSDEVMIN—mean absolute deviation relative to the minimum valid path length, and
    MABSDEVMAX—mean absolute deviation relative to the maximum valid path length;
  scale—specifies a scaling after normalization of the input time series with respect to the target time series, which may be selected from the following options:
    NONE—No scaling,
    ABS—Absolute scaling, and
    STD—Standard scaling;
  expandpct—specifies a warping expansion as a percentage of the length of the target time series, where the values range from zero to 100 such that expandpct=0 results in no compression and expandpct=100 results in a maximum allowable compression;
  expandabs—specifies an absolute warping expansion, where integer values range from zero to 10,000;
  compresspct—specifies a warping compression as a percentage of the length of the target time series, where the values range from zero to 100 such that compresspct=0 results in no compression and compresspct=100 results in a maximum allowable compression; and
  compressabs—specifies an absolute warping compression, where integer values range from zero to 10,000.
RETURNED VALUES
  rc—a return code, which may include one of the following options:
    4—warping limits relaxed,
    3—expansion limits relaxed,
    2—compression limits relaxed,
    1—warping limits imposed,
    0—successful, and
    <0—computational failure; and
  measure—the similarity measure.

The EXPAND options (expandpct and expandabs) specify a warping expansion range of the target time series with respect to the input time series. Expansion of the target time series is the same as compression of the input time series and vice versa. The expansion limits are imposed on the target time series.

The COMPRESS options (compresspct and compressabs) specify the warping compression range of the target time series with respect to the input time series. Compression of the target time series is the same as expansion of the input time series and vice versa. The compression limits are imposed on the target time series.

Let $d_{i,j}=d(x_i,y_j)$, represent a distance metric computed by TSA_SIMILARITY between an input time series value, $x_i$, and a target time series value, $y_j$. The following examples illustrate two of many possible distance metrics:

Squared deviation (SQRDEV): $d_{i,j}=(x_i-y_j)^2$

Absolute deviation (ABSDEV): $d_{i,j}=|x_i-y_j|$

There are $N_x \times N_y$ possible distance metrics that can be computed between the input and target time series values, $N_x$ is a number of points of the input time series and $N_y$ is a number of points of the target time series. Let D represent the $N_x \times N_y$ matrix of possible distance metrics between the input and target time series values, where $d_{i,j}$ represents the $(i,j)^{th}$ element of the distance matrix, where j is the row index, and i is the column index of the matrix.

Since the distance matrix D contains many elements, similarity measures may summarize the distance matrix D into a single number as Sim(X,Y)=Norm(D). For example, the distance matrix D can be summarized as:

Norm$(D)=\Sigma_{i=1}^{N_x}\Sigma_{j=1}^{N_y}d_{i,j}$, which sums the elements, $$\text{Norm}(D) = \sum_{i=1}^{N_x} \sum_{j=1}^{N_y} d_{i,j}/(N_x N_y),$$

which averages the elements, $$\text{Norm}(D) = \min_{i,j}\{d_{i,j}\},$$

which uses a minimum of the elements, etc.

These illustrative similarity measures ignore an ordering of the time series values. For example, the distances $d_{1,1}$ and $d_{1,N_y}$ are treated with equal importance in these similarity measures even though they compare time series values that might be far apart with respect to their timing.

Other similarity measures can compare the various paths through the distance matrix, starting with element (1,1) and ending with element ($N_x,N_y$), and determine a path that minimizes a sum or average of the distances along the path or the cost of traversing the path. Paths are a way to step through the distance matrix from element to element without stepping on the same element twice and preserving the timing between the two time series. Diagonal path movements represent direct maps. Vertical path movements represent compression of the target sequence. Horizontal path movements represent expansion of the target sequence. Similarity measures that exploit the ordering of the time series can penalize distances that are far apart with respect to their timing. In computing a similarity measure, a goal may be to find a path that minimizes the cost of traversing the path such as finding a path that has smaller distances between the input and target time series values.

Similarity measures can be used to compare a plurality of time series by forming a similarity matrix. For example, given K time series (e.g., the extracted, time windowed, incident signatures), a K×K symmetric matrix can be constructed whose ijth element contains the similarity measure between the ith and jth time series.

In an operation 1210, a third indicator of a clustering model is received. For example, the third indicator indicates a name of a type of clustering model and one or more configuration parameters associated with defining the clustering model. In other embodiments, the clustering model may not be selectable such that a default clustering model is used. The purpose of cluster analysis is to place objects into groups, or clusters, suggested by the data, not defined a priori, such that objects in a given cluster tend to be similar to each other in some sense, and objects in different clusters tend to be dissimilar. For example, disjoint clusters place each object in one and only one cluster; whereas, hierarchical clusters are organized so that one cluster can be entirely contained within another cluster, but no other kind of overlap between clusters is allowed.

For illustration, a clustering model similar to that described in U.S. patent application Ser. No. 14/482,726, filed Sep. 10, 2014, and assigned to SAS Institute Inc. of Cary, N.C., USA may be used. The entire contents of U.S. patent application Ser. No. 14/482,726 are hereby incorporated herein by reference. The clustering model further may be the TS Similarity Node of SAS® Enterprise Miner™.

As another illustration, the CLUSTER Procedure from SAS®/STAT® 9.3 (developed and provided by SAS Institute Inc. of Cary, N.C., USA) may be used to cluster a plurality of time series such as the extracted, time windowed, incident signatures. The similarity matrix can be input to the CLUSTER procedure to hierarchically cluster the extracted, time windowed, incident signatures using various methods that may be selected by the user or by default using the configuration parameters. The clustering methods include: average linkage, a centroid method, complete linkage, density linkage (including Wong's hybrid and kth-nearest-neighbor methods), the flexible-beta method, McQuitty's similarity analysis, the median method, single linkage, two-stage density linkage, Ward's minimum-variance method, etc.

Each similarity measure in the similarity matrix begins in a cluster by itself. The two closest clusters are merged to form a new cluster that replaces the two old clusters. Merging of the two closest clusters is repeated until only one cluster is left. The various clustering methods differ in how the distance between two clusters is computed. The CLUSTER procedure may determine statistics such as the cubic clustering criterion statistic, the pseudo F statistic, and the pseudo $t^2$ statistic that can be used to estimate a number of clusters into which the extracted, time windowed, incident signatures are segmented. The CLUSTER procedure may also create output data that can be used by the TREE procedure from SAS®/STAT® 9.3 to output a cluster membership at any desired level.

In an operation 1212, the indicated similarity model is executed using the aligned, time windowed, incident signatures to define the similarity matrix. For example, a distance matrix may be computed using the TIMEDATA procedure described above to compute a similarity measure for each pair of incident signatures.

In an operation 1214, the indicated clustering model is executed using the similarity matrix to define incident clusters. For example, hierarchical clustering may be performed using the CLUSTER procedure with the distance matrix as an input to determine a cluster index indicating an assigned cluster for each incident signature based on a number of clusters determined by evaluating the cubic clustering criterion statistic, the pseudo F statistic, and/or the pseudo $t^2$ statistic. The number of incident clusters determines the size of reference signatures database 716.

In an operation 1216, known incident types are assigned to the defined incident clusters, where possible. For example, an incident type value may be stored in reference incidents database 714 for incidents for which a cause or a type of the incident is known or has been determined, for example, by post-incident analysis application 816c. For illustration, examples causes or types may be lightning, transformer failure, etc. in a power grid system.

A cause or type of one or more incidents may be unknown, which also may be indicated by the incident type value. For example, the incident type value field may be empty, NULL, unknown, etc. when the incident cause is unknown. In an alternative embodiment, incidents for which a cause of the incident is known may be stored in a known incident reference database separate from reference incidents database 714, and/or incidents for which a cause of the incident is unknown may be stored in an unknown incident reference database separate from reference incidents database 714.

The incident type value of each of the incidents associated with each cluster is evaluated to define a cluster incident type value associated with the respective cluster of the selected incident clusters. For example, unknown types may be ignored, and a known type associated with the majority of the incidents assigned to each respective cluster may be used as the cluster incident type value of the respective cluster. In an illustrative embodiment, incident clusters for which the cluster incident type value is unknown may not be selected as incident clusters.

In an operation 1218, the incident signatures associated with each incident cluster are stored in reference signatures database 716 with a cluster assignment indicator and the cluster incident type value.

Reference signatures database 716 may be implemented using various formats as known to those skilled in the art including a file system, a relational database, a system of tables, a structured query language database, etc. For example, reference signatures database 716 may be stored in a cube distributed across a grid of computers as understood by a person of skill in the art. As another example, reference signatures database 716 may be stored in a multi-node Hadoop® cluster, as understood by a person of skill in the art. As another example, reference signatures database 716 may be stored in a cloud of computers and accessed using cloud computing technologies, as understood by a person of skill in the art.

Execution of operations 1200-1218 may be repeated at various intervals that may or may not be periodic. For example, execution of operations 1200-1218 may be triggered by a user, by a timer, by a number of new incidents added to reference incidents database 714, etc. to update reference signatures database 716.

Figure 13:
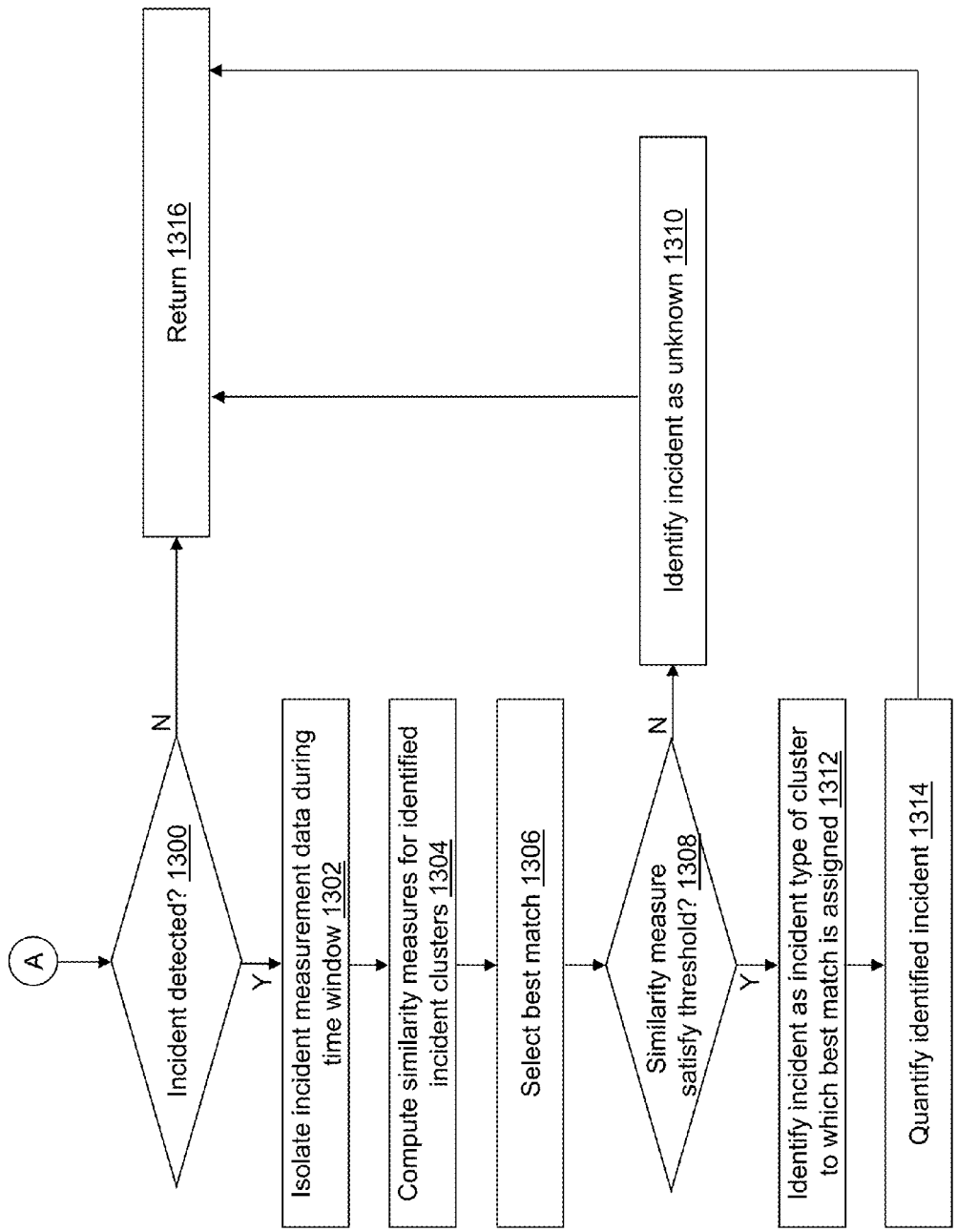
FIG. 13 depicts flow diagrams illustrating examples of operations performed by the ESP device of FIG. 4 in accordance with an illustrative embodiment.

Referring to FIG. 13, example operations associated with ESP application 412 are described. Additional, fewer, or different operations may be performed depending on the embodiment. The order of presentation of the operations of FIG. 13 is not intended to be limiting.

In an operation 1300, a determination is made concerning whether or not an incident is detected, for example, using incident detection application 1100. When an incident is detected, processing continues in an operation 1302. When an incident is not detected, processing continues in an operation 1316 to return to operation 514 of FIG. 5 to continue to evaluate events 414 for an incident. As described previously, operation 1300 may not be performed so that each event block object of events 414 is processed to potentially identify an incident.

For illustration, SAS®/ETS® 14.1 developed and provided by SAS Institute Inc. of Cary, N.C., USA includes time series forecasting procedures including a TIME-SERIES Procedure, a TIMEDATA Procedure, a SIMILARITY Procedure, a FORECAST Procedure, an ARIMA Procedure, etc. that may be used to detect occurrence of an incident. As another illustrative example, a decision tree or other predictive model may be used to detect occurrence of an incident. A plurality of models may be used to detect an incident.

As an illustrative example, to detect an incident using streaming data from sensors on a power transmission grid, a real time forecast stream is computed and compared to the actual value from the streaming data to compute a residual value. For example, a current, a voltage, a frequency, and/or a phase angle may be included in events 414. The residual values, without the time series trends, can be monitored using a control limit computed based on a moving standard deviation value. A number of standard deviations used to define the control limit may be predefined, for example, by a user stream processing system 100 or a developer of ESP application 412 and its associated continuous queries 604. A streaming data value that exceeds the control limit may trigger detection of an incident.

In another illustrative example, a plurality of individual data streams may be monitored to see if a number of values exceed the control limit. The plurality of individual data streams may be for different sensor type measurements (e.g., current versus voltage) and/or for different sensor locations. If a predefined number of control limit values are exceeded across the monitored individual data streams during a predefined time period, an incident may be detected. The predefined number and the predefined time period may be determined by post-incident analysis application 816c using reference incidents database 714, may be defined by a user stream processing system 100 or by a developer of ESP application 412 and its associated continuous queries 604, etc.

In operation 1302, measurement data values included in the event block objects from a start time (current time if incident is not detected first) to the optimal time window length determined in operation 1202 are isolated and extracted as a current incident signature.

In an operation 1304, similarity measures between the current incident signature and each reference signature stored in reference signatures database 716 are computed. Reference signatures database 716 may be stored in second computer-readable medium 408 of ESP device 104 or may be accessed through second communication interface 406 of ESP device 104. For example, reference signatures database 716 may be stored in a RAM type or cache type memory of second computer-readable medium 408 for real-time access. The adjustment value computed relative to each reference signature may be stored in a RAM type or cache type memory of second computer-readable medium 408.

For illustration, the similarity model indicated in operation 1208, such as the TIMEDATA procedure from SAS®/ETS® 14.1, may be used to compute a similarity between the captured current incident signature and each reference signature stored in reference signatures database 716 to form a similarity vector. For example, given a single target time series, the captured current incident signature, a similarity vector can be constructed whose $k^{th}$ element contains the similarity measure between the captured current incident signature and the $k^{th}$ reference signature stored in reference signatures database 716. The similarity measure may be computed by determining a minimum path through a matrix of distance values computed between each pair of data points of the captured current incident signature and the $k^{th}$ reference signature.

In operation 1306, a best matching reference signature is selected for the current incident signature from the reference signatures stored in reference signatures database 716. For example, a "most similar" or "closest" reference signature can be selected as the reference signature that has a minimum value of the similarity measure. In an alternative embodiment, a "most similar" or "closest" reference signature can be selected as the reference signature that has a maximum value of the similarity measure.

In an operation 1308, a determination is made concerning whether or not the computed similarity measure associated with the best match satisfies a threshold value. The threshold value may be stored in second computer-readable medium 408. The threshold value may be computed based on the results of the clustering model executed in operation 1214 by computing an average of the adjustment values required to match the reference signatures included in each incident cluster stored in reference signatures database 716. Other statistical values may be used to compute the threshold value.

When the computed similarity measure of the best matching reference signature satisfies the threshold value, processing continues in an operation 1312. When the computed similarity measure of the best matching reference signature does not satisfy the threshold value, processing continues in an operation 1310.

In operation 1310, the current incident signature is identified as unknown, and processing continues in operation 1316 to return to operation 514 of FIG. 5 to continue to evaluate events 414 for a detected incident.

In an operation 1312, the incident type associated with the incident cluster to which the best matching reference signature is assigned is selected as the incident type of the current incident signature.

In an operation 1314, a severity of the identified incident is quantified, for example, using incident quantification application 1104 and processing continues in operation 1316 to return to operation 514 of FIG. 5 to continue to evaluate events 414 for a detected incident.

In operation 514 of FIG. 5, the current incident signature may be stored to reference incidents database 714 and/or incident database 814. For unknown incidents, the current incident signature and computed adjustment values may be saved to an unknown incident database. Post-incident analysis may be performed on the unknown incident database to identify previously unknown incident signatures. For example, post-incident analysis may be performed by an engineer in the relevant domain (e.g. an electrical engineer for a power grid application) using an analysis tool such as a data visualization tool or a machine learning tool.

Whether an incident type is consequential or non-consequential may be stored in reference signatures database 716. Control system application 816a, incident notification application 816b, and/or control operator display application 816d may respond to incident types identified as consequential. For example, in operation 514 of FIG. 5, when the current incident signature is identified as an incident type classified as consequential, a notification may be sent to one or more devices of incident information subscribing systems 108 that are associated with incident responders. As another example, when the current incident signature is identified as an incident type classified as consequential, a notification may be sent to and/or presented on one or more devices of incident information subscribing systems 108 that are associated with a control operator display. As yet another example, when the current incident signature is identified as an incident type classified as consequential, a control response may be determined by control system application 816a and sent to one or more devices of incident information subscribing systems 108 that are capable of responding to the control response.

Figure 14:
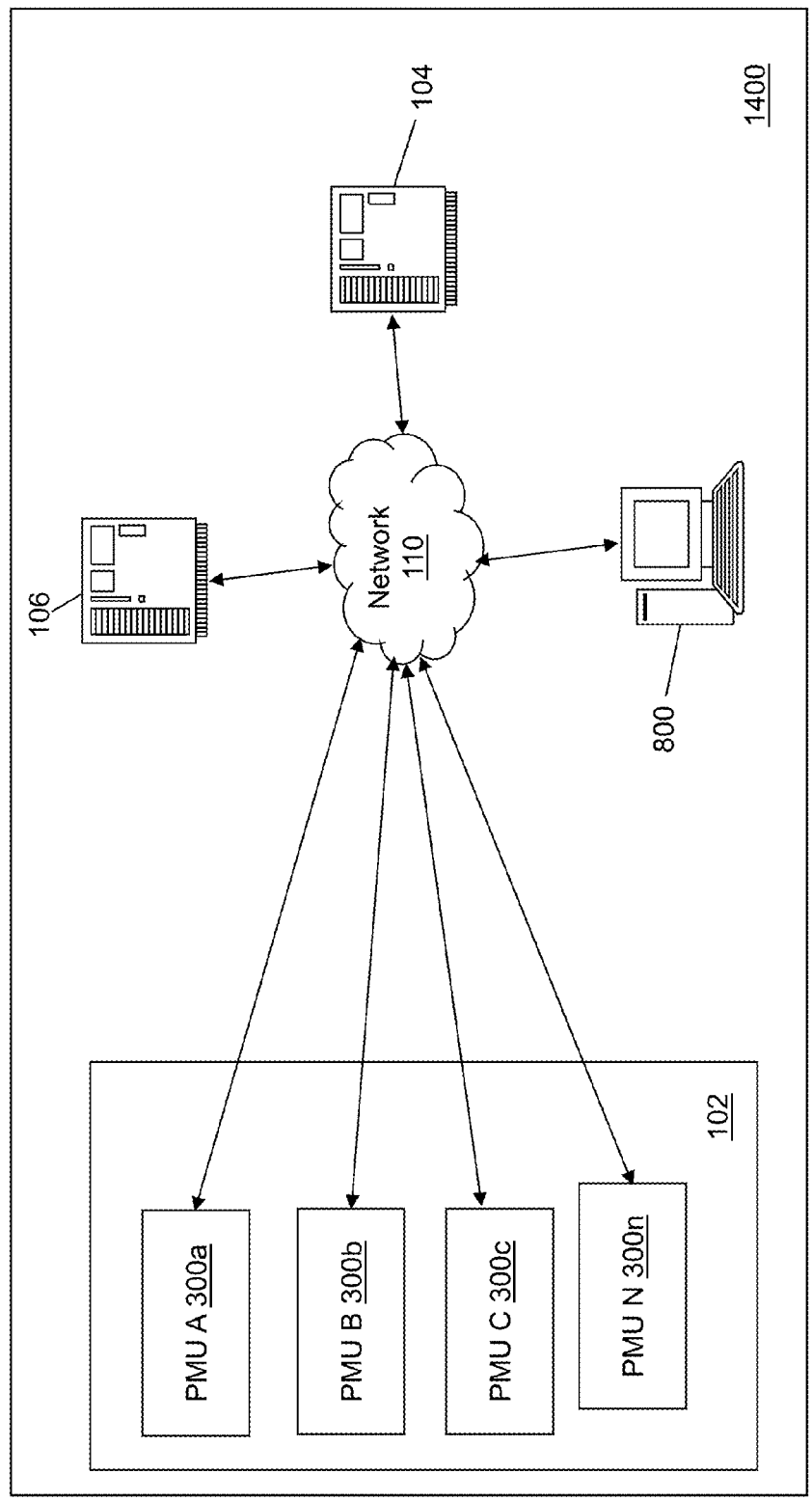
FIG. 14 depicts an instance of the stream processing system of FIG. 1 in accordance with an illustrative embodiment.
Figure 15B:
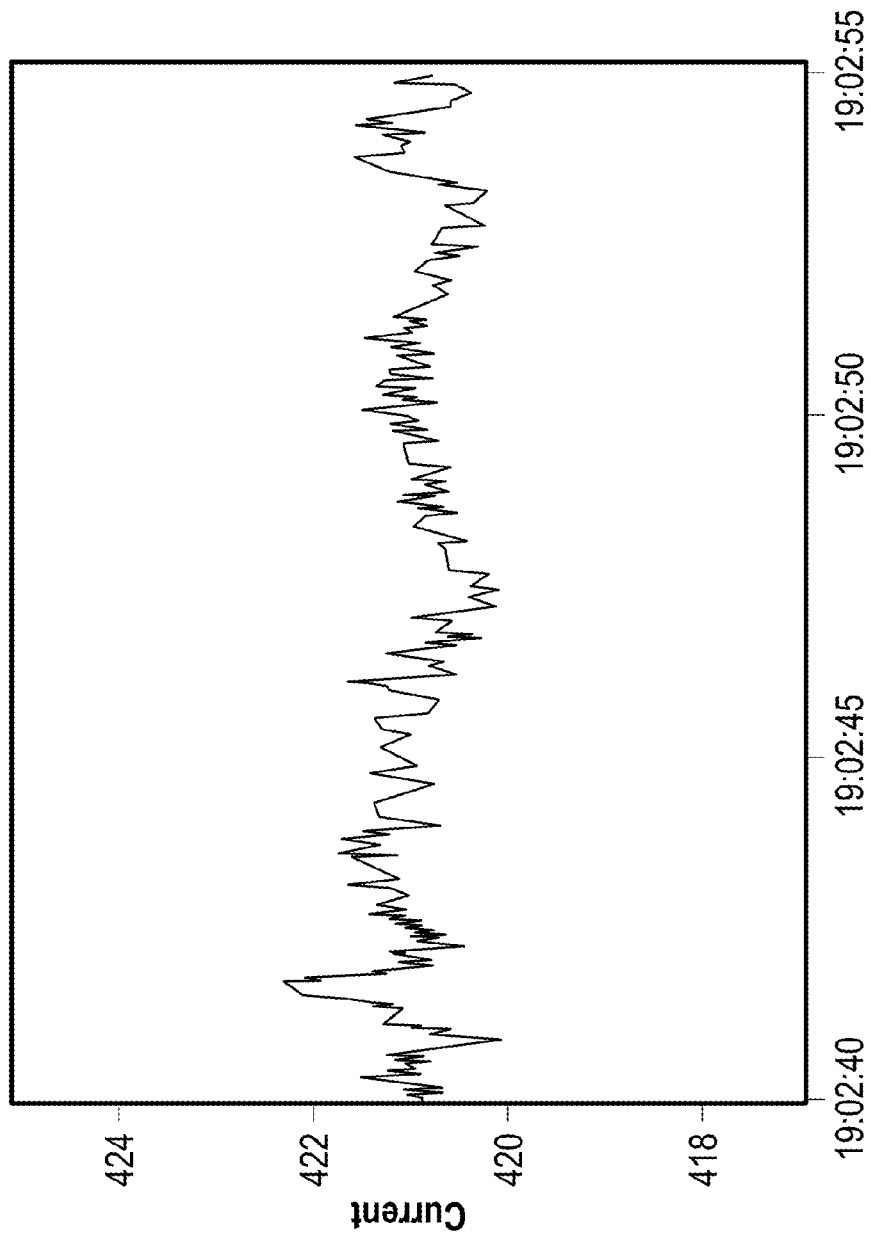
Figure 15C:
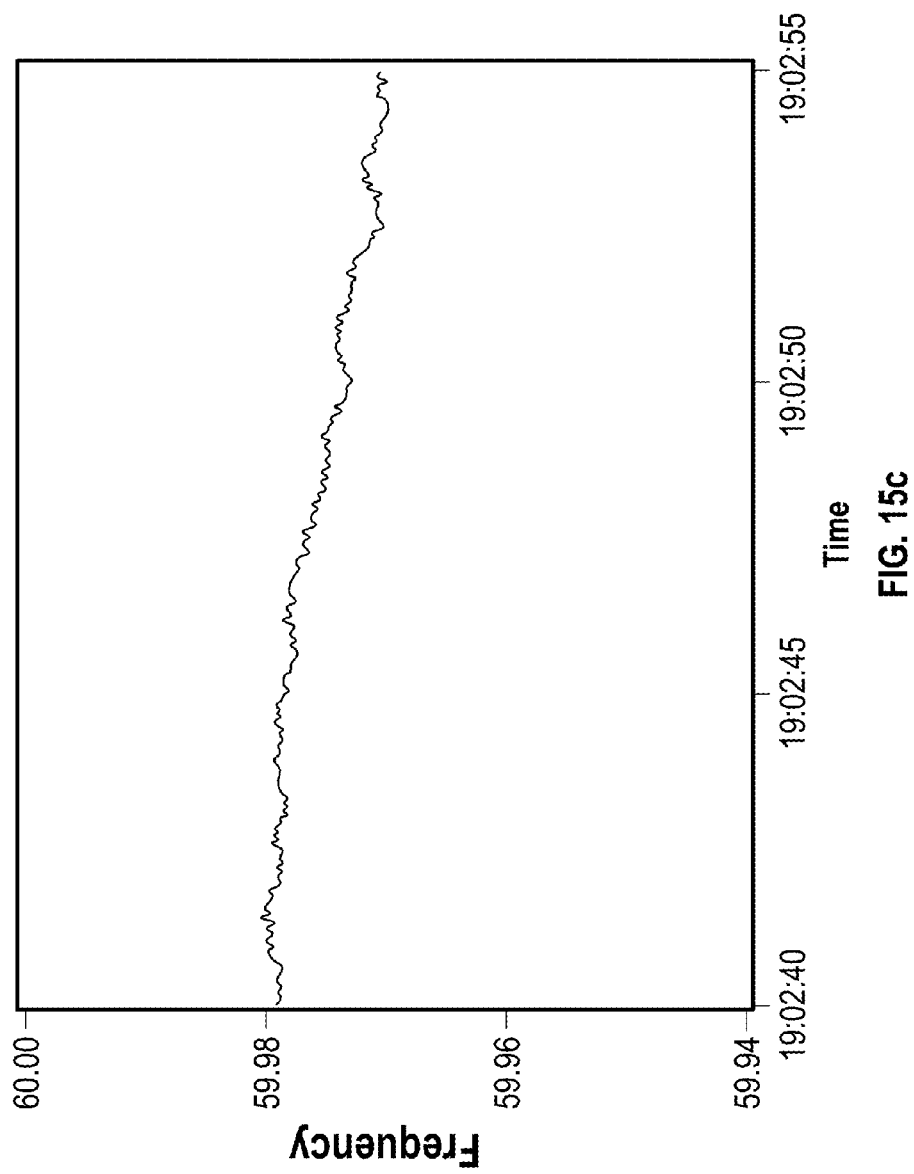
Figure 15D:
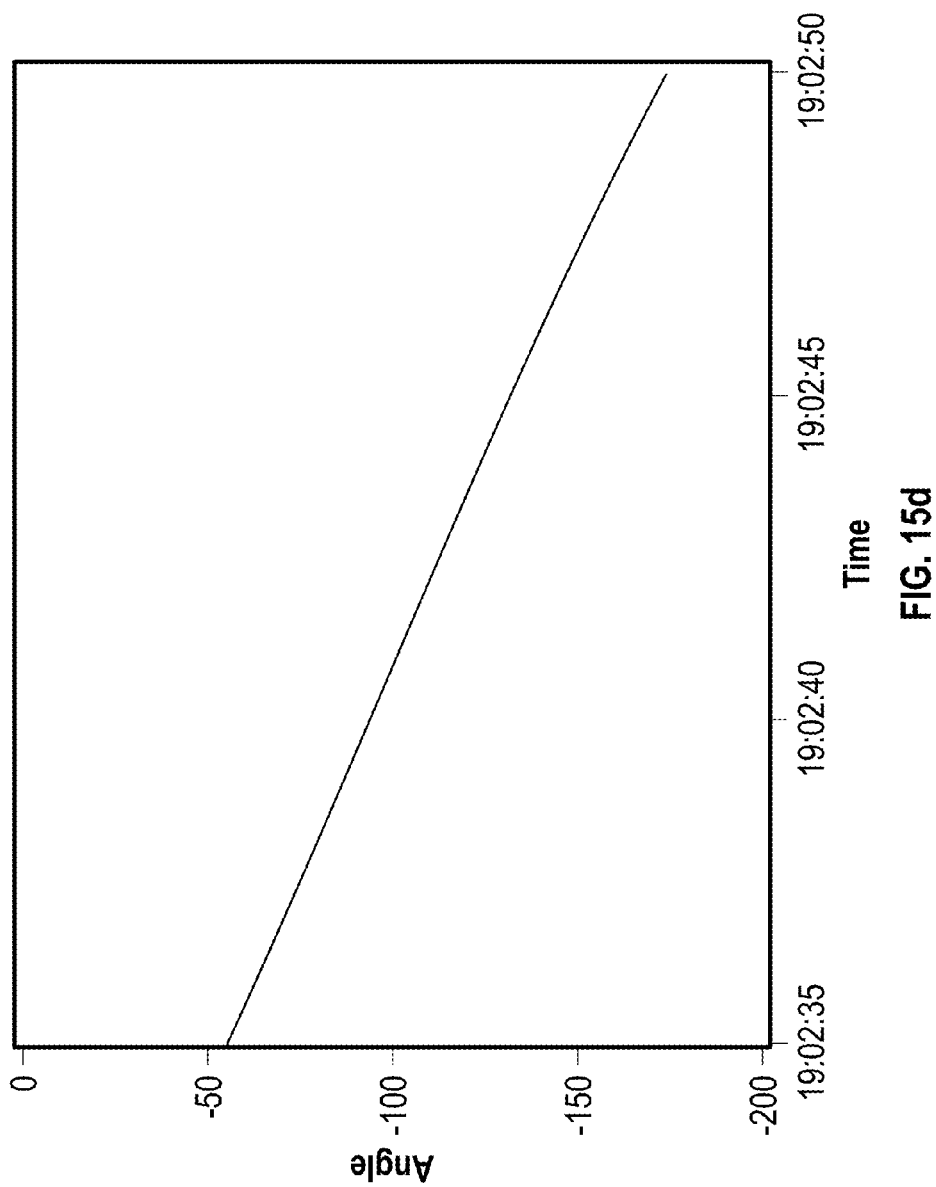
Figure 16A:
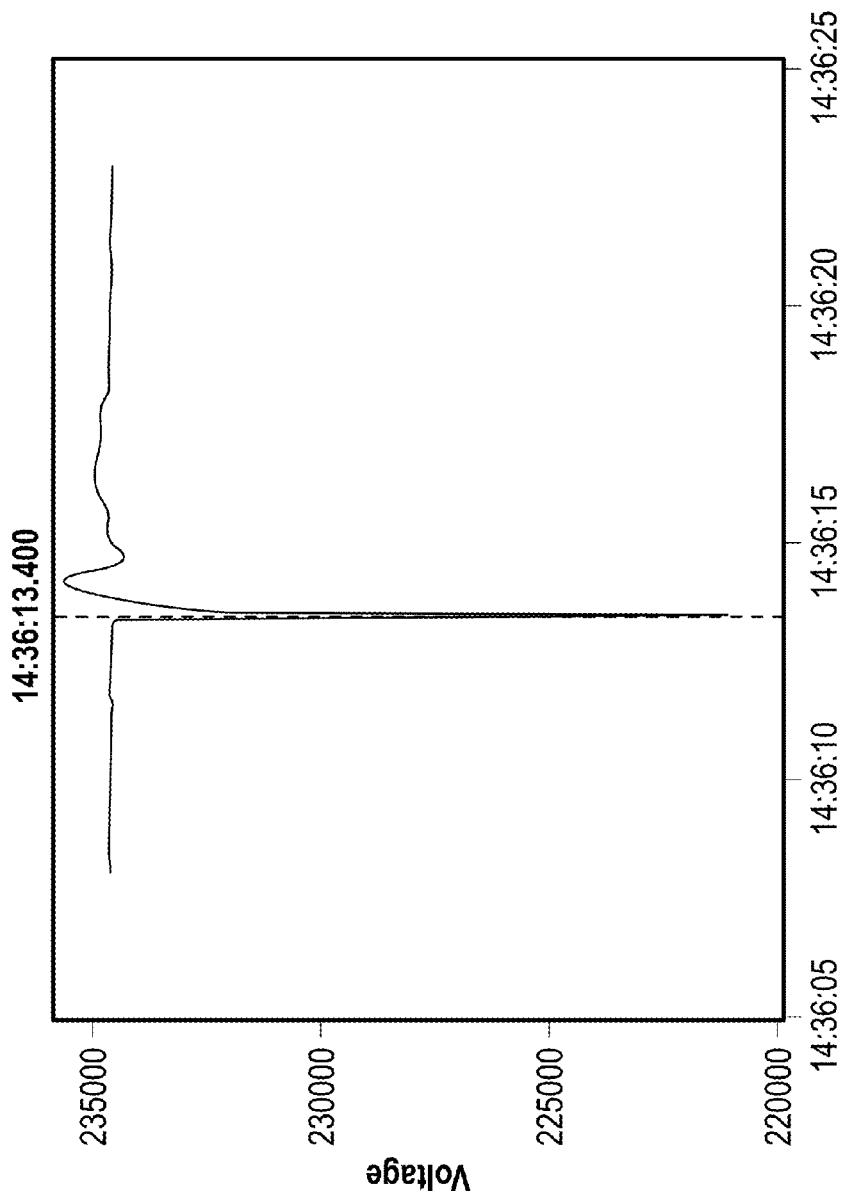
Figure 16B:
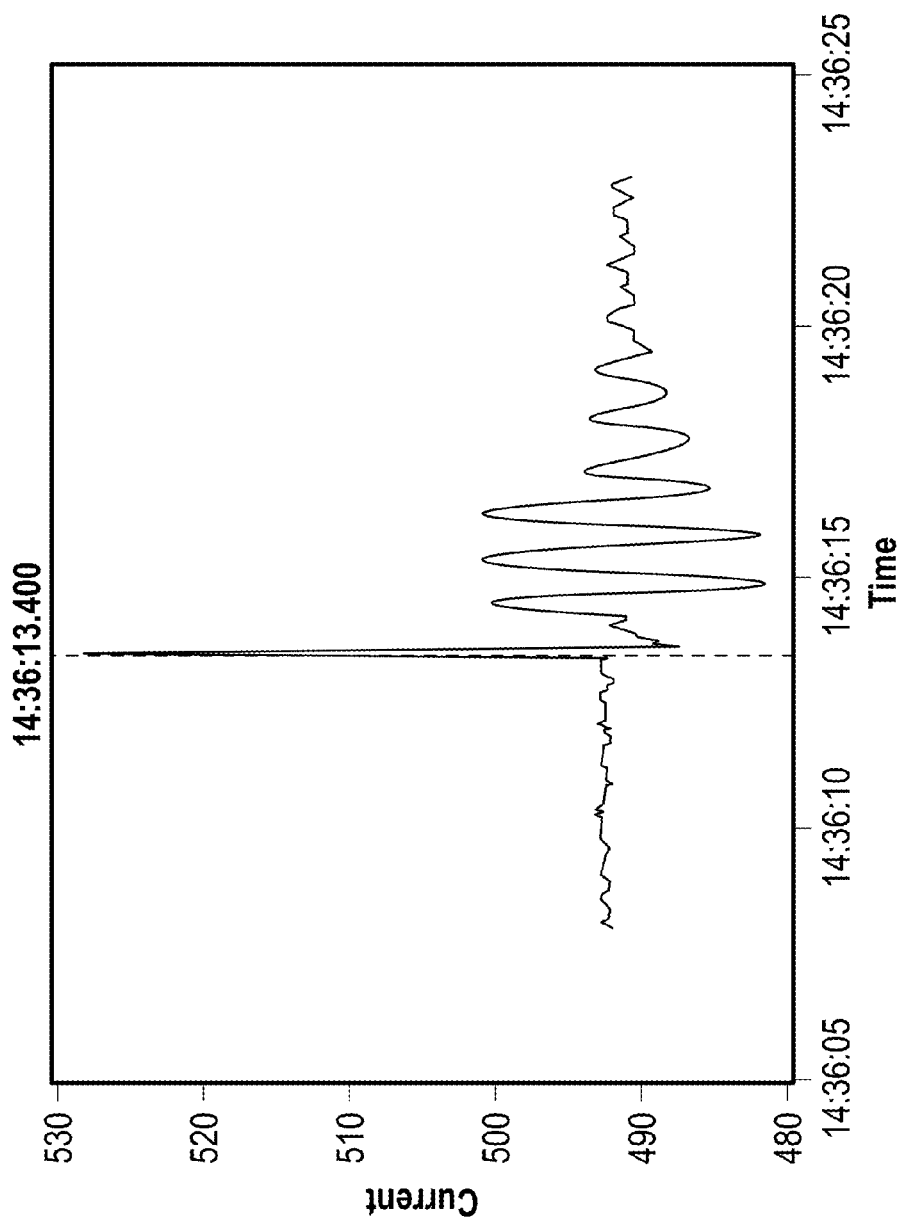
Figure 16C:
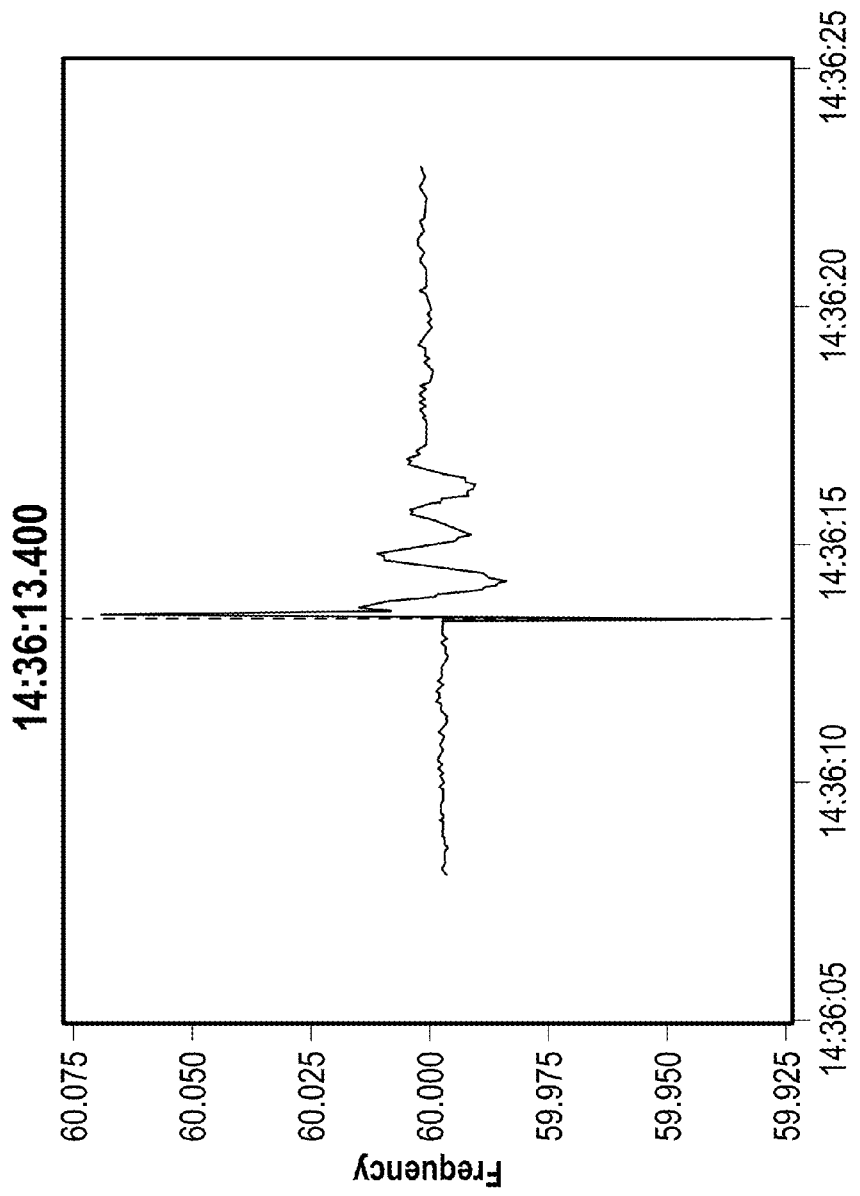

Referring to FIG. 14, a first stream processing system 1400 is shown that is an instance of stream processing system 100 in accordance with an illustrative embodiment. First stream processing system 1400 is integrated into a power transmission grid. The power transmission grid may be a "smart" grid that uses digital technology to provide two-way communication between the utility and its customers and an "Internet of Things" between devices on the grid including power sources, transmission sensors, substation controllers, power meters, etc.

The plurality of event publishing systems 102 of first stream processing system 1400 include a plurality of phasor measurement units (PMUs) that are distributed geographically. Each PMU is connected to measure a voltage magnitude, a current magnitude, a frequency, and a phase angle of electrical energy at various points in the power transmission grid. Each PMU timestamps the data, for example, using a global positioning system (GPS) clock to synchronize the measurements across locations. The measurements may be generated and collected at a fixed interval such as 30 measurements per second.

In the illustrative embodiment of FIG. 14, the PMUs include a PMU A 300a, a PMU B 300b, a PMU C 300c, a PMU N 300n though any number of PMUs may be included in first stream processing system 1400. Though not shown in FIG. 14, groups of the PMUs may be organized into subnets that send measurement data values from a group of PMUs to a data concentrator each of which may include the first ESP device that publishes the measurement data values to ESP device 104.

In the illustrative embodiment of FIG. 14, reference incidents database 714 and/or incident database 814 were initialized with historical measurement data values from 100+ PMUs. Operations 1200 to 1218 of FIG. 12 were performed on the historical measurement data values to define incident clusters and to store the reference signatures associated with defined incident clusters in reference signatures database 716.

For an illustrative implementation on a power grid, incidents are things like lightning strikes, vegetation or animal incursions, line trips, equipment failures, etc. Data is continuously collected from sensors on the power grid. As incidents occur, the data from the sensors during the event produce a unique pattern that forms a signature for that incident. These patterns are compared to known reference patterns using similarity analysis to provide the incident identification.

PMUs were installed at various points on the power grid, usually at sub-stations. In this example, time windows of 15 seconds were analyzed because power grid incidents typically occur within that time frame. In other applications, different time windows may be chosen that better fit the incidents being identified.

FIGS. 15a-15d show normal operating measurements for the voltage, current, frequency, and phase angle, respectively. These examples represent the amount of variability in the measurement typically encountered during normal operation of the power grid.

FIGS. 16a-16d show measurements for the voltage, current, frequency, and phase angle, respectively, for a time window within which a lightning strike incident occurred. It is very clear to see when the strike occurred and the resulting data pattern referred to as a signature for the incident. The dotted reference line is the time of the lightning strike as determined by incident detection application 1100. As an example, the voltage dropped by almost 15,000 volts.

Figure 17A:
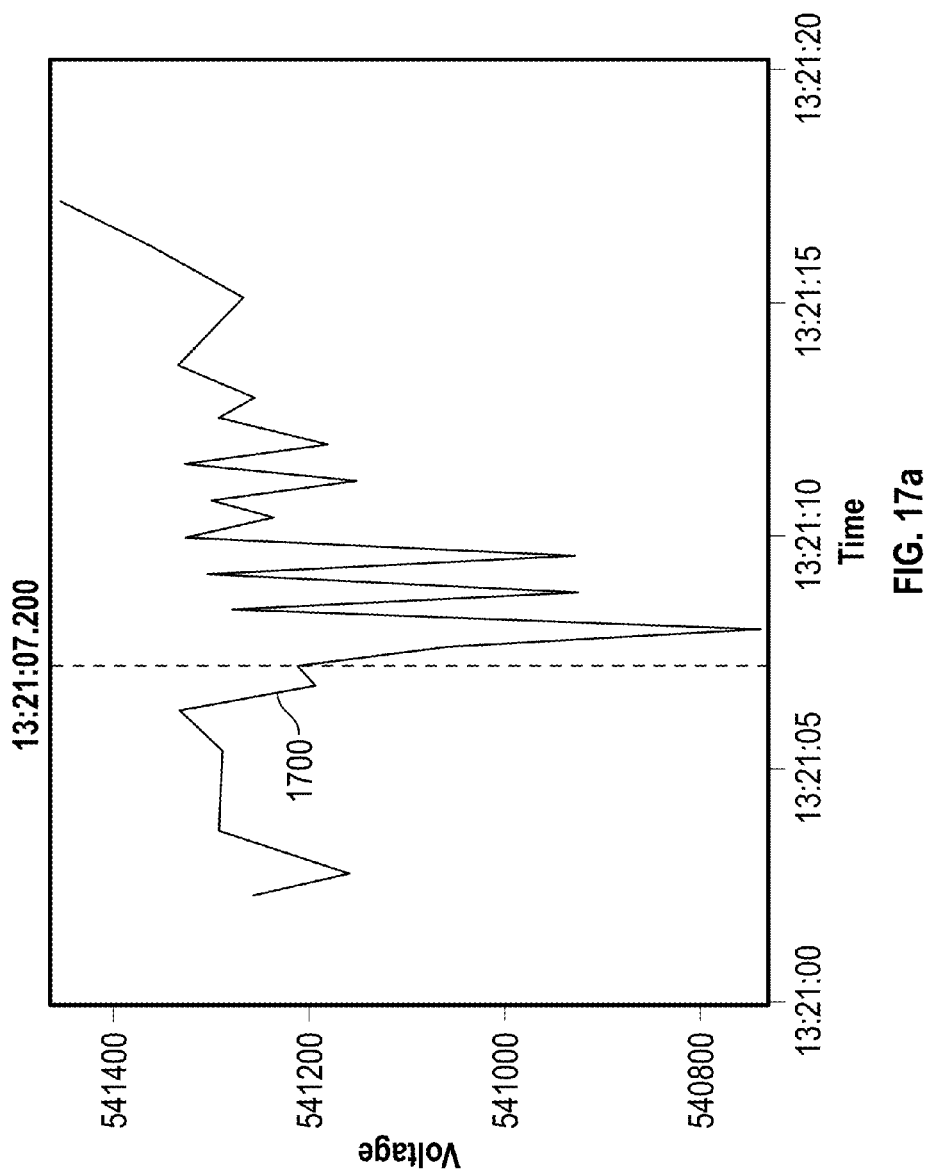
FIGS. 17a-17b show measurements for the voltage and current, respectively, of the instance of FIG. 14 in accordance with an illustrative embodiment for a time window within which a "line trip" incident occurred.
Figure 17B:
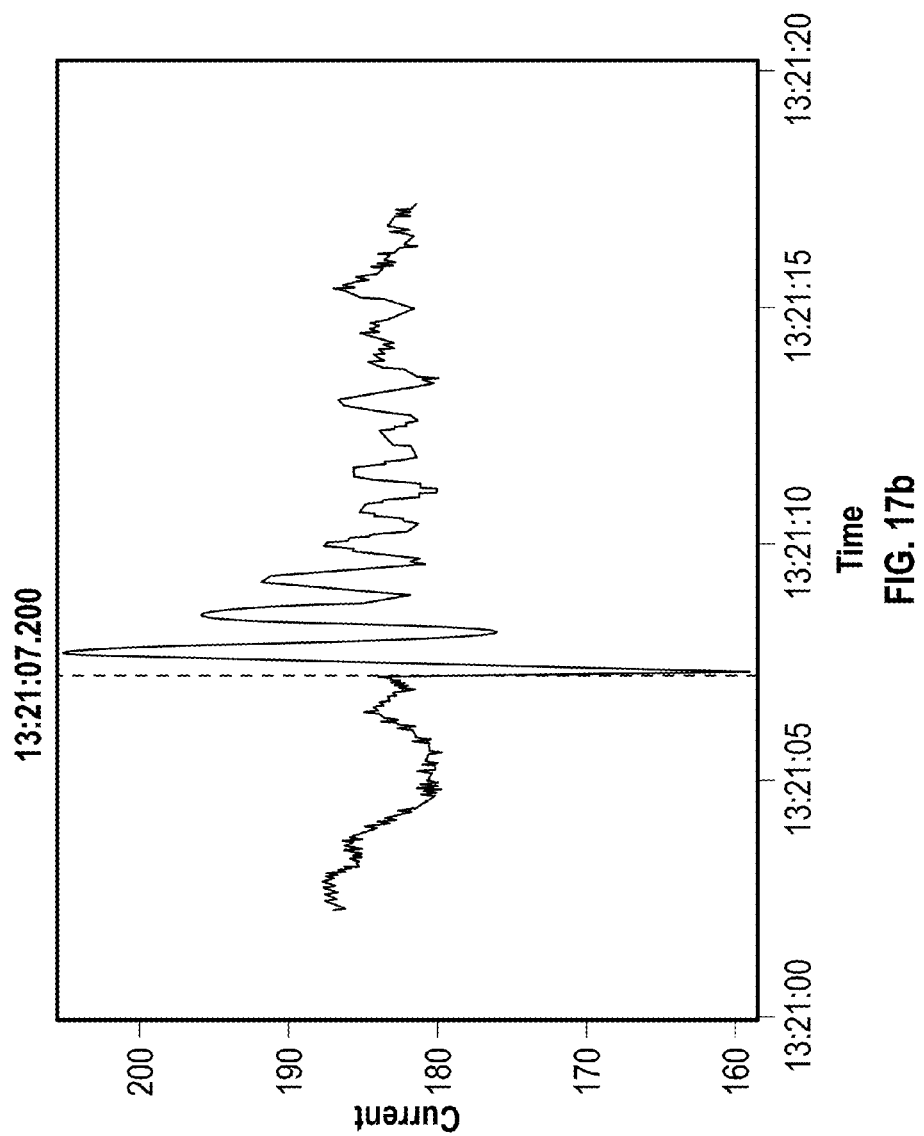

FIGS. 17a-17b show measurements for the voltage and current, respectively, for a time window within which a "line trip" incident occurred. A line trip occurs when a breaker on one of the power grid lines disconnects. The dotted reference line is the time the line trip incident was detected by incident detection application 1100. For example, a line trip voltage measurement curve 1700 indicates occurrence of the line trip incident at 13:21:07.200. The signature patterns for the line trip incident are distinct and different from the signature patterns observed for the lightning strike incident.

Figure 18A:
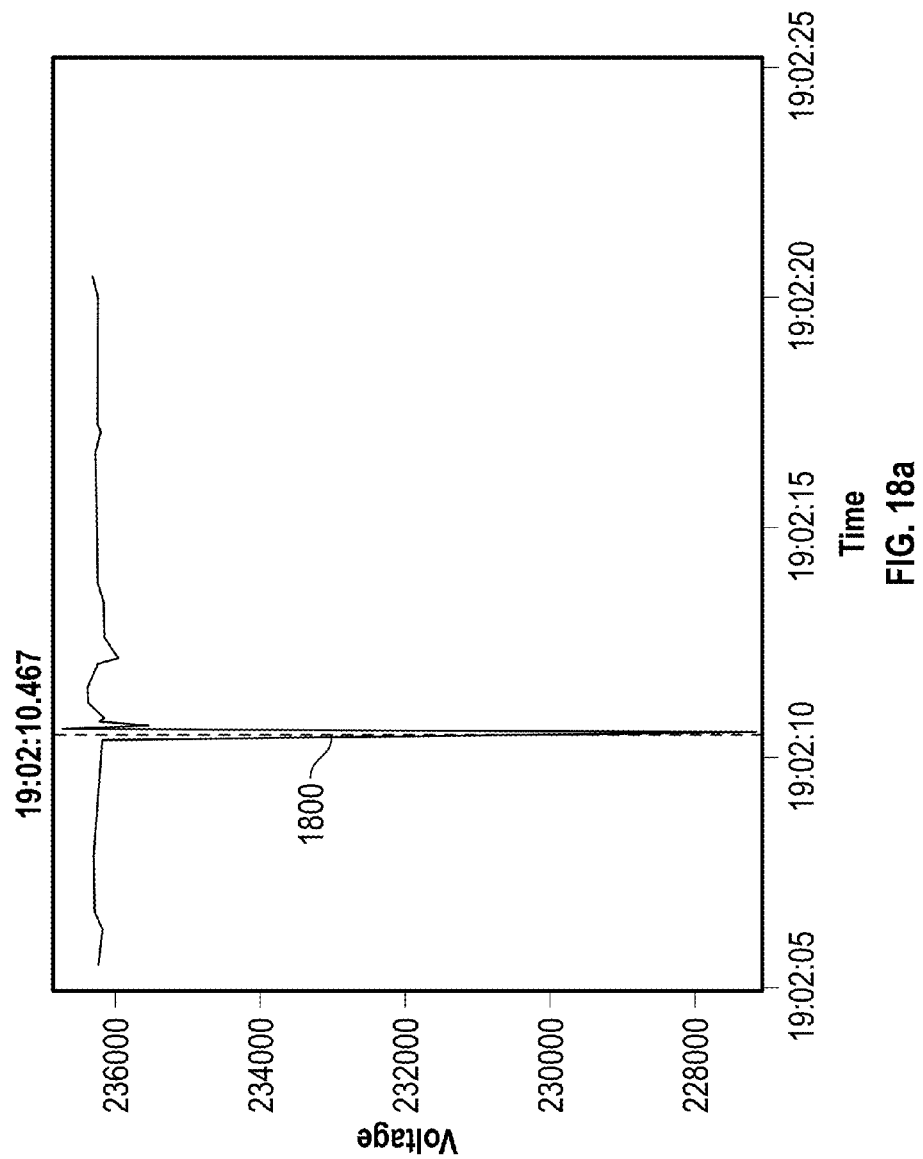
FIGS. 18a-18b show measurements for the voltage and current, respectively, of the instance of FIG. 14 in accordance with an illustrative embodiment for a second time window within which a second lightning strike incident occurred.
Figure 18B:
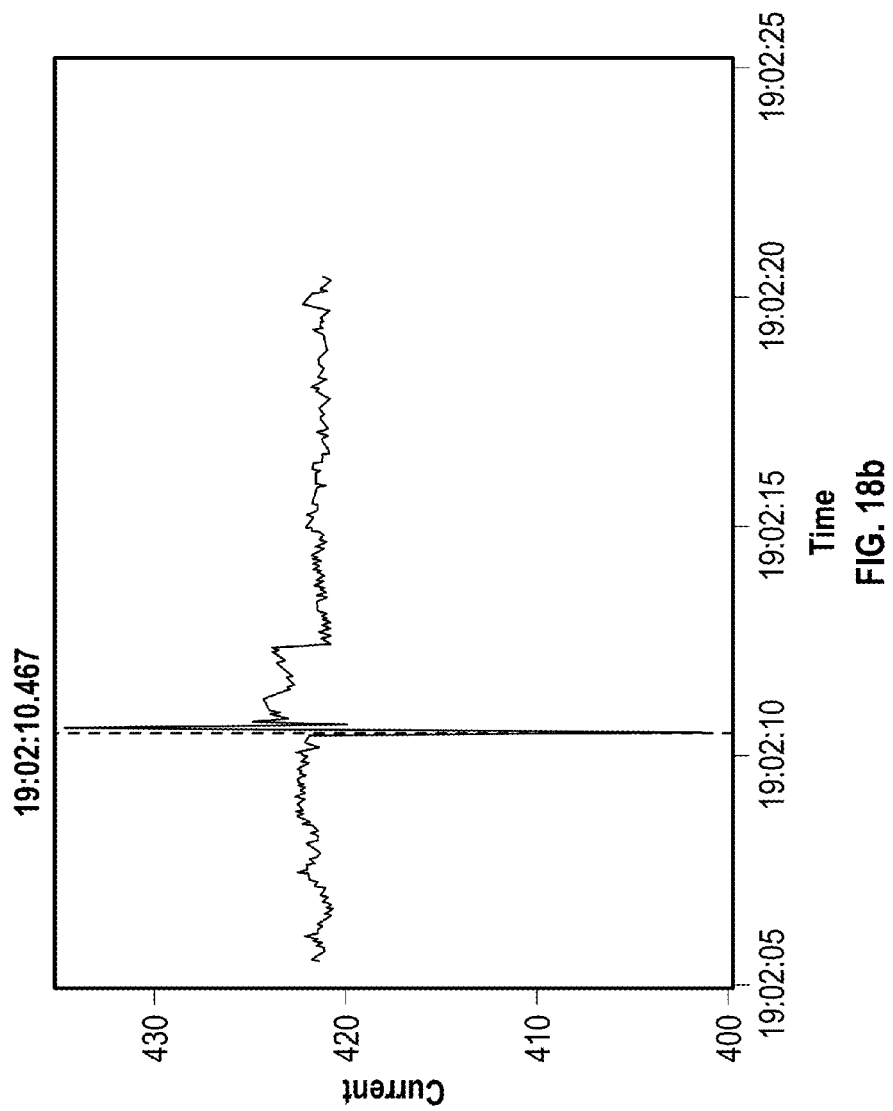
Figure 19:
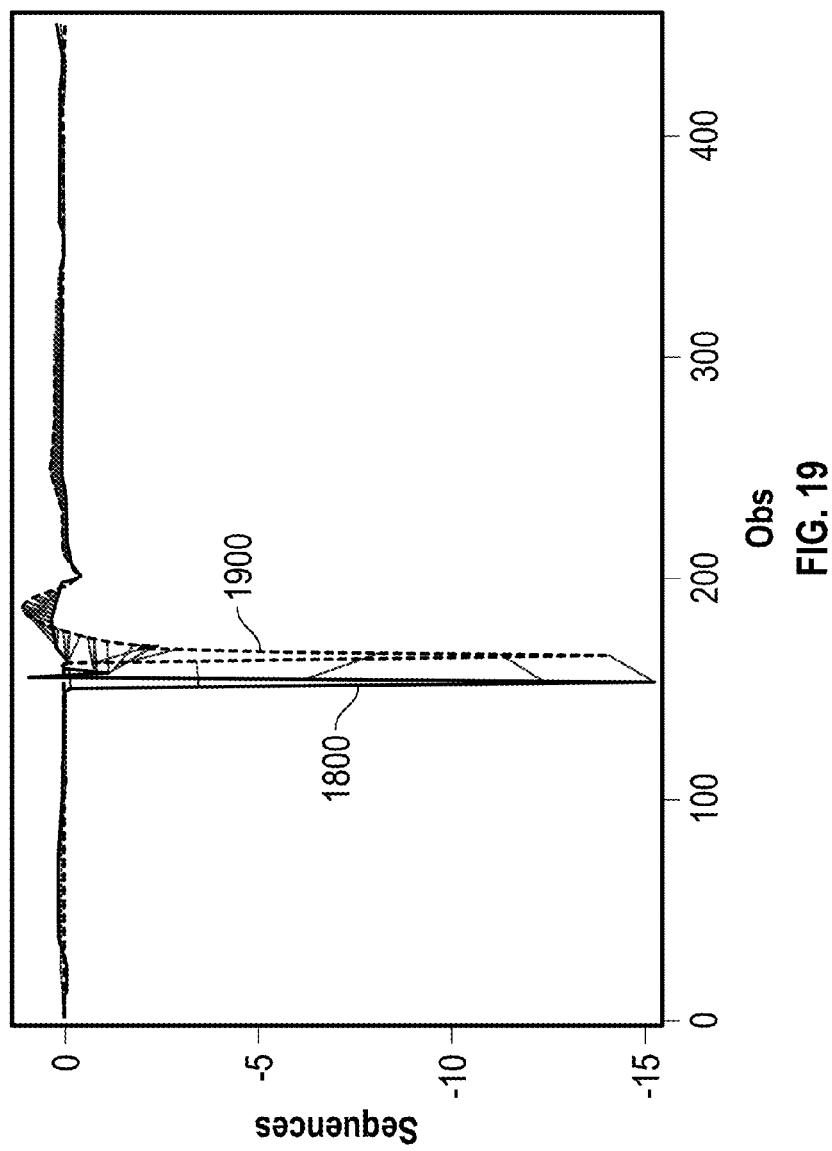
FIG. 19 shows a comparison between a lightning strike voltage measurement curve of FIG. 18a and an incoming incident voltage measurement curve in accordance with an illustrative embodiment.

FIGS. 18a-18b show measurements for the voltage and current, respectively, for a second time window within which a second lightning strike incident occurred. For example, a lightning strike voltage measurement curve 1800 indicates occurrence of the second lightning strike incident at 19:02:10.467. The second lightning strike occurred at a different time and location as the previous lightning strike. The signature pattern for the second lightning strike looks very close visually to the previous lightning strike, though not identical to the previous lightning strike. Incident identification application 1102 compares the two signature patterns and provides a measure of how similar the two patterns are. For example, the similarity measure may be called a minimum measure summary score that results in a lower value when the two patterns more closely match each other. For illustration, incident identification application 1102 may include the following code that provides the measure in the "sim_outmeasure" data set:

ods graphics on;
    ods pdf file="Similarity.pdf";
    title "Similarity Analysis Line Trip";
    proc similarity data=sim_vapm
        out=sim_out        outmeasure=sim_outmeasure outsum=sim_outsum
        print=summary plot=warps;
        input vapm_input/setmissing=prev normalize=standard;
        target vapm_linetrip/measure=absdev setmissing=prev normalize=standard;
    run;
    ods pdf close;
    title;

Referring to FIG. 19, a comparison between lightning strike voltage measurement curve 1800 and an incoming incident voltage measurement curve 1900 is shown. The resulting graph indicates how closely the two patterns compare. The minimum measure summary score determined by incident identification application 1102 was 48.33499. The minimum measure summary score is a relative score, so the units of measure are not important.

Figure 20:
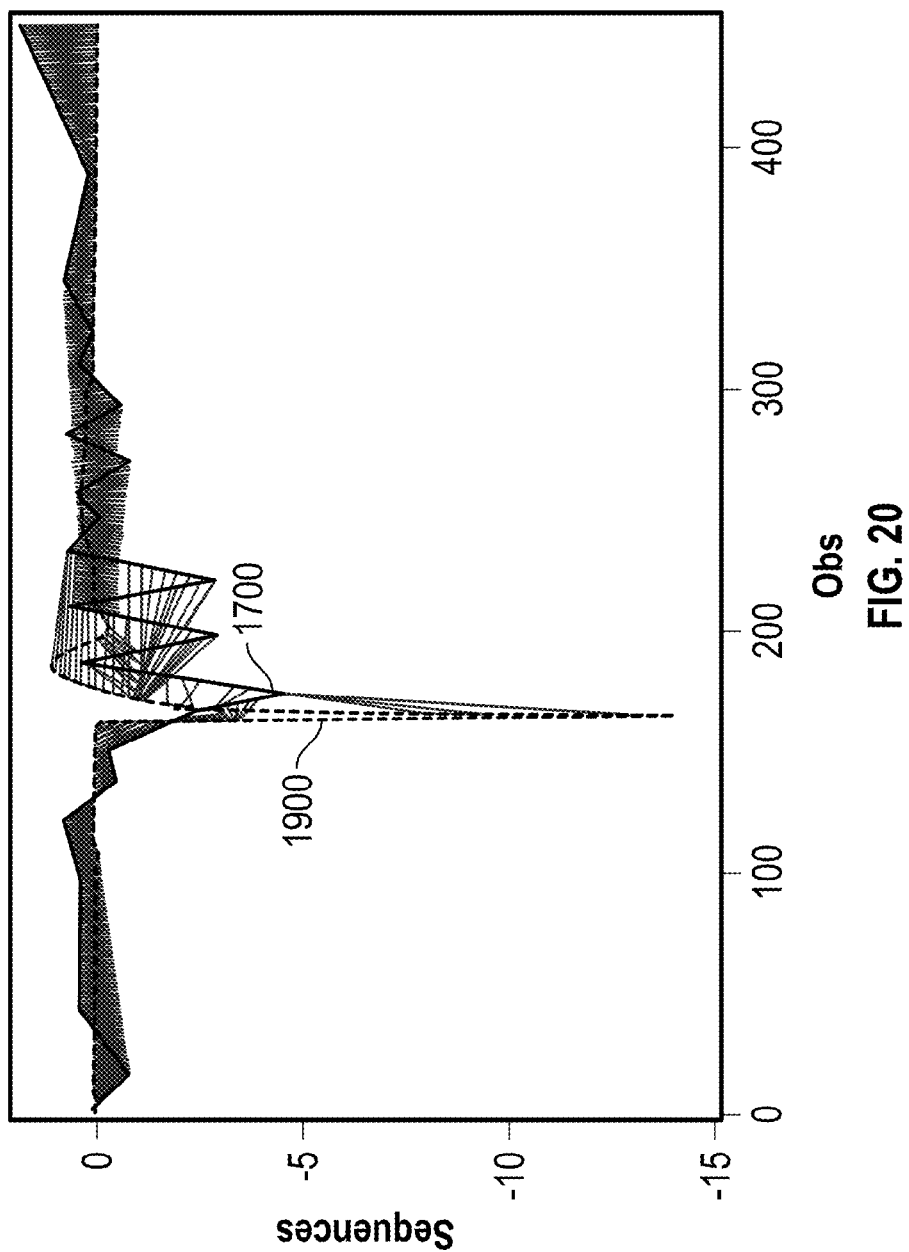

Referring to FIG. 20, a comparison between incoming incident voltage measurement curve 1900 and line trip voltage measurement curve 1700 is shown. The resulting graph indicates that the two patterns do not match as close as those shown in FIG. 19. In this case, the minimum measure summary score determined by incident identification application 1102 was 231.1319. This score is measurably higher than the score of 48.33499 produced by comparing the incoming incident to the known lightning strike incident. Because the minimum measure summary score for the lightning strike incident is lower than the minimum measure summary score for the line trip incident, the incident can be identified as a lightning strike.

Incident information subscribing device 800 may be a visualization system of a grid control center that receives notifications of detected, identified, and/or quantified incidents.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    receive an event block object from an event publishing device,
        wherein the event block object is received as part of an event stream of a plurality of event block objects received from the event publishing device,
        wherein the event block object includes a measurement data value and a time value,
        wherein the measurement data value is generated by a sensor at a time indicated by the time value;
    forecast a value for the measurement data value;
    compute a residual value as a difference between the measurement data value and the forecasted value;
    compute an upper control limit value and a lower control limit value;
    detect an incident when the computed residual value is greater than the computed upper control limit value or when the computed residual value is less than the computed lower control limit value; and
    when the incident is detected,
        extract a plurality of measurement data values and associated time values for the plurality of event block objects that occur during a time window;
        compute a similarity measure between the extracted measurement data values and each of a plurality of reference incident signatures defined for incidents that occurred previously in time;
        select a best matching reference incident signature from the computed similarity measures;
        compare the computed similarity measure for the selected best matching reference incident signature to a threshold value; and
        when the computed similarity measure for the selected best matching reference incident signature satisfies the threshold value based on the comparison, identify a type of incident for the extracted measurement data values as a type of incident defined for the selected best matching reference incident signature and output the identified type of incident and the extracted measurement data values to an incident information subscribing device.

2. The non-transitory computer-readable medium of claim 1, wherein the threshold is satisfied when the computed similarity measure for the selected best matching reference incident signature is less than or equal to the threshold value.

3. The non-transitory computer-readable medium of claim 1, wherein when the computed similarity measure for the selected best matching reference incident signature does not satisfy the threshold value based on the comparison, the computer-readable instructions further cause the computing device to identify the type of incident for the extracted measurement data values as unknown.

4. The non-transitory computer-readable medium of claim 3, wherein the computer-readable instructions further cause the computing device to output the identified type of incident and the extracted measurement data values to an incident information subscribing device.

5. The non-transitory computer-readable medium of claim 1, wherein the reference incident signatures are stored in a database.

6. The non-transitory computer-readable medium of claim 5, wherein the database is stored by a second computing device different from the computing device.

7. The non-transitory computer-readable medium of claim 1, wherein the incident information subscribing device is a control operator display device.

8. The non-transitory computer-readable medium of claim 1, wherein the incident information subscribing device is an incident notification device.

9. The non-transitory computer-readable medium of claim 1, wherein the incident information subscribing device is an incident database.

10. The non-transitory computer-readable medium of claim 1, wherein each reference signature of the plurality of reference incident signatures includes a plurality of second measurement data values in one-to-one association with a plurality of second time values.

11. The non-transitory computer-readable medium of claim 10, wherein the computer-readable instructions further cause the computing device to compute the similarity measure between the extracted measurement data values and a reference incident signature of the plurality of reference incident signatures by computing a matrix of distance measures between the extracted measurement data values and the plurality of second measurement data values associated with the reference incident signature, wherein the matrix is $N_x \times N_y$, where $N_x$ is a number of points of the extracted measurement data values and $N_y$ is a number of points of the plurality of second measurement data values associated with the reference incident signature.

12. The non-transitory computer-readable medium of claim 11, wherein each distance measure $d_{i,j}$ of the matrix of distance measures represents an $(i,j)^{th}$ element of the matrix, where j is a row index, and i is a column index of the matrix, and $d_{i,j}$ is computed based on $(x_i - y_j)$, where $x_i$ is an $i^{th}$ extracted measurement data value of the extracted measurement data values and $y_j$ is a $j^{th}$ second measurement data value of the plurality of second measurement data values.

13. The non-transitory computer-readable medium of claim 12, wherein the similarity measure is computed by determining a minimum path through the matrix of distance measures.

14. The non-transitory computer-readable medium of claim 1, wherein the best matching reference incident signature is selected as a reference incident signature associated with a minimum value of the computed similarity measures.

15. The non-transitory computer-readable medium of claim 1, wherein the best matching reference incident signature is selected as a reference incident signature associated with a maximum value of the computed similarity measures.

16. The non-transitory computer-readable medium of claim 1, wherein the measurement data value is a measure of a frequency, of a voltage, of a current, or of a phase angle of electrical energy in a power grid.

17. The non-transitory computer-readable medium of claim 1, wherein the measurement data value is a measure of a humidity, of a temperature, of a sound level, of a movement, or of a light level at a location.

18. The non-transitory computer-readable medium of claim 1, wherein the upper control limit value is computed as an average residual value plus a predefined number of standard deviations multiplied by a standard deviation value.

19. The non-transitory computer-readable medium of claim 18, wherein the forecast value, the average residual value, and the standard deviation value are computed based on each measurement data value received in the event stream.

20. The non-transitory computer-readable medium of claim 19, wherein detecting occurrence of the incident is performed for each measurement data value received in the event stream.

21. The non-transitory computer-readable medium of claim 1, wherein the time value of the event block object for which the incident is detected is a start time of the time window.

22. The non-transitory computer-readable medium of claim 21, wherein an end time of the time window is computed as the start time plus a predefined time window length.

23. The non-transitory computer-readable medium of claim 1, wherein the plurality of reference incident signatures are determined by clustering a plurality of incident signatures that occurred previously in time.

24. The non-transitory computer-readable medium of claim 23, wherein the type of incident defined for the selected best matching reference incident signature is determined based on a cluster to which the selected best matching reference incident signature is assigned and an incident type of an incident signature assigned to the cluster.

25. The non-transitory computer-readable medium of claim 24, wherein the similarity measure is computed using a similarity model, and the similarity model is used to define a similarity matrix input to a clustering model used to cluster the plurality of incident signatures.

26. A computing device comprising:
a processor; and
a computer-readable medium operably coupled to the processor, the computer-readable medium having computer-readable instructions stored thereon that, when executed by the processor, cause the computing device to
receive an event block object from an event publishing device,
wherein the event block object is received as part of an event stream of a plurality of event block objects received from the event publishing device,
wherein the event block object includes a measurement data value and a time value,
wherein the measurement data value is generated by a sensor at a time indicated by the time value;
forecast a value for the measurement data value;
compute a residual value as a difference between the measurement data value and the forecasted value;
compute an upper control limit value and a lower control limit value;
detect an incident when the computed residual value is greater than the computed upper control limit value or when the computed residual value is less than the computed lower control limit value; and
when the incident is detected,
extract a plurality of measurement data values and associated time values for the plurality of event block objects that occur during a time window;
compute a similarity measure between the extracted measurement data values and each of a plurality of reference incident signatures defined for incidents that occurred previously in time;
select a best matching reference incident signature from the computed similarity measures;

compare the computed similarity measure for the selected best matching reference incident signature to a threshold value; and when the computed similarity measure for the selected best matching reference incident signature satisfies the threshold value based on the comparison, identify a type of incident for the extracted measurement data values as a type of incident defined for the selected best matching reference incident signature and output the identified type of incident and the extracted measurement data values to an incident information subscribing device.

27. A method of performing incident identification on streamed event data, the method comprising:

receiving an event block object from an event publishing device,
wherein the event block object is received as part of an event stream of a plurality of event block objects received from the event publishing device,
wherein the event block object includes a measurement data value and a time value,
wherein the measurement data value is generated by a sensor at a time indicated by the time value;

forecasting, by a computing device, a value for the measurement data value;

computing, by the computing device, a residual value as a difference between the measurement data value and the forecasted value;

computing, by the computing device, an upper control limit value and a lower control limit value;

detecting, by the computing device, an incident when the computed residual value is greater than the computed upper control limit value or when the computed residual value is less than the computed lower control limit value; and when the incident is detected, extracting, by the computing device, a plurality of measurement data values and associated time values for the plurality of event block objects that occur during a time window;

computing, by the computing device, a similarity measure between the extracted measurement data values and each of a plurality of reference incident signatures defined for incidents that occurred previously in time;

selecting, by the computing device, a best matching reference incident signature from the computed similarity measures;

comparing, by the computing device, the computed similarity measure for the selected best matching reference incident signature to a threshold value; and when the computed similarity measure for the selected best matching reference incident signature satisfies the threshold value based on the comparison, identifying, by the computing device, a type of incident for the extracted measurement data values as a type of incident defined for the selected best matching reference incident signature and output the identified type of incident and the extracted measurement data values to an incident information subscribing device.

28. The computing device of claim 26, wherein the upper control limit value is computed as an average residual value plus a predefined number of standard deviations multiplied by a standard deviation value, and the forecast value, the average residual value, and the standard deviation value are computed based on each measurement data value received in the event stream.

29. The method of claim 27, wherein the upper control limit value is computed as an average residual value plus a predefined number of standard deviations multiplied by a standard deviation value, and the forecast value, the average residual value, and the standard deviation value are computed based on each measurement data value received in the event stream.

* * * * *